United States Patent
Henry et al.

(10) Patent No.: US 12,333,923 B2
(45) Date of Patent: Jun. 17, 2025

(54) AUTOMATED ALERT SYSTEM USING UNMANNED AERIAL VEHICLES

(71) Applicant: Asylon, Inc., Philadelphia, PA (US)

(72) Inventors: Damon C. Henry, Philadelphia, PA (US); Brent Mclaughlin, Savage, MD (US); Adam I. Mohamed, Philadelphia, PA (US); Justin Kantor, Morrisville, PA (US); Eric Timmons, Medford, MA (US)

(73) Assignee: Asylon, Inc., Philadelphia, PA (US)

( * ) Notice: Subject to any disclaimer, the term of this patent is extended or adjusted under 35 U.S.C. 154(b) by 40 days.

(21) Appl. No.: 17/185,495

(22) Filed: Feb. 25, 2021

(65) Prior Publication Data

US 2021/0284335 A1 Sep. 16, 2021

Related U.S. Application Data

(60) Provisional application No. 62/990,205, filed on Mar. 16, 2020.

(51) Int. Cl.
*G08B 25/10* (2006.01)
*B64F 1/36* (2024.01)
(Continued)

(52) U.S. Cl.
CPC .............. *G08B 25/10* (2013.01); *B64F 1/362* (2013.01); *B64U 10/14* (2023.01); *B64U 50/19* (2023.01);
(Continued)

(58) Field of Classification Search
CPC ....... B64C 39/024; B64F 1/362; G08B 25/10; B64U 2201/10; B64U 10/13
See application file for complete search history.

(56) References Cited

U.S. PATENT DOCUMENTS 6,518,915 B2 * 2/2003 Schutz ................ G08B 13/187
340/552
7,250,853 B2 * 7/2007 Flynn ................ G08B 13/1672
340/541
(Continued)

FOREIGN PATENT DOCUMENTS

CN 110553549 B * 4/2023 ............. F41H 11/02
DE 10 2013 004 881 A1 9/2014
(Continued)

OTHER PUBLICATIONS

"Mohapatra, Suvendu et al., Big data analytic architecture for intruder detection in heterogeneous wireless sensor networks. Mar. 10, 2016, Journal of Network and Computer Applications, vol. 66" (Year: 2016).*

(Continued)

*Primary Examiner* — Russell Frejd
*Assistant Examiner* — Christopher R Cardimino
(74) *Attorney, Agent, or Firm* — Levine Bagade Han LLP

(57) ABSTRACT

An automated alert system using unmanned aerial vehicles is described where the system is configured to monitor a selected area via one or more sensors configured to monitor the selected area for an anomaly. A processor in communication with the one or more sensors may be programmed to create or alter a flight path of an unmanned aerial vehicle upon receiving an alert from the one or more sensors for investigating or verifying the anomaly.

10 Claims, 20 Drawing Sheets

(51) Int. Cl.
*B64U 10/14* (2023.01)
*B64U 50/19* (2023.01)
*B64U 50/39* (2023.01)
*B64U 70/90* (2023.01)

(52) U.S. Cl.
CPC .............. *B64U 50/39* (2023.01); *B64U 70/90* (2023.01); *B64U 2201/10* (2023.01)

(56) References Cited

U.S. PATENT DOCUMENTS

| | | | |
|---|---|---|---|
| 7,554,446 B2 * | 6/2009 | Ciarcia, Jr. | G08B 13/2417 |
| | | | 340/568.1 |
| 7,957,850 B2 | 6/2011 | Anderson | |
| 8,244,469 B2 | 8/2012 | Cheung et al. | |
| 8,511,606 B1 | 8/2013 | Lutke et al. | |
| 8,862,288 B2 | 10/2014 | Vavrina et al. | |
| 8,899,903 B1 | 12/2014 | Saad et al. | |
| 9,026,272 B2 | 5/2015 | Kokkeby et al. | |
| 9,139,310 B1 | 9/2015 | Wang | |
| 9,174,747 B2 | 11/2015 | Kang | |
| 9,384,668 B2 | 7/2016 | Raptopoulos et al. | |
| 9,429,945 B2 | 8/2016 | Pulleti et al. | |
| 9,466,219 B1 | 10/2016 | Stefani et al. | |
| 9,481,458 B2 | 11/2016 | Casado et al. | |
| 9,527,392 B2 | 12/2016 | Peverill et al. | |
| 9,642,230 B2 * | 5/2017 | DeMao | G01R 21/133 |
| 9,652,960 B2 * | 5/2017 | Flinsenberg | G16H 40/20 |
| 9,741,255 B1 | 8/2017 | Navot et al. | |
| 9,783,075 B2 | 10/2017 | Henry et al. | |
| 9,969,285 B2 | 5/2018 | Henry et al. | |
| 10,173,773 B1 * | 1/2019 | Flick | G08G 5/26 |
| 10,204,520 B2 | 2/2019 | Demetriades et al. | |
| 10,283,000 B2 * | 5/2019 | Marr | G08G 5/57 |
| 10,643,061 B2 * | 5/2020 | Kusens | H04N 7/18 |
| 10,841,539 B2 * | 11/2020 | Drinkard | F16P 3/142 |
| 10,858,121 B2 * | 12/2020 | Bill | H04L 63/0492 |
| 2011/0273284 A1 | 11/2011 | Jones et al. | |
| 2013/0104361 A1 | 5/2013 | Corfitsen | |
| 2014/0035736 A1 | 2/2014 | Weddle et al. | |
| 2014/0129059 A1 | 5/2014 | Scarlatti et al. | |
| 2014/0303814 A1 | 10/2014 | Burema et al. | |
| 2014/0319272 A1 | 10/2014 | Casado Magana et al. | |
| 2015/0069968 A1 | 3/2015 | Pounds | |
| 2015/0097530 A1 | 4/2015 | Scarlatti et al. | |
| 2016/0011592 A1 | 1/2016 | Zhang et al. | |
| 2016/0029466 A1 | 1/2016 | DeMao et al. | |
| 2016/0039542 A1 | 2/2016 | Wang | |
| 2016/0116914 A1 | 4/2016 | Mucci | |
| 2016/0122038 A1 | 5/2016 | Fleischman et al. | |
| 2016/0253908 A1 * | 9/2016 | Chambers | G05D 1/1064 |
| | | | 701/2 |
| 2017/0092109 A1 | 3/2017 | Trundle et al. | |
| 2017/0092138 A1 | 3/2017 | Trundle et al. | |
| 2017/0096075 A1 | 4/2017 | Henry et al. | |
| 2017/0120763 A1 | 5/2017 | Henry et al. | |
| 2017/0283090 A1 * | 10/2017 | Miller | B64U 70/97 |
| 2018/0086455 A1 | 3/2018 | Burch, V et al. | |
| 2018/0165945 A1 * | 6/2018 | McClendon | G01S 19/17 |
| 2018/0222339 A1 * | 8/2018 | Henry | B64F 1/007 |
| 2018/0357909 A1 | 12/2018 | Eyhorn | |
| 2019/0114925 A1 * | 4/2019 | Schulman | G08G 5/57 |
| 2019/0118946 A1 | 4/2019 | Winn et al. | |
| 2019/0285748 A1 * | 9/2019 | DeVries | G01S 17/04 |
| 2019/0357032 A1 * | 11/2019 | South | H04W 4/90 |
| 2020/0053325 A1 * | 2/2020 | Deyle | H04N 7/185 |

FOREIGN PATENT DOCUMENTS

| | | | | |
|---|---|---|---|---|
| WO | WO 2016/019242 | | 2/2016 | |
| WO | WO-2016154936 A1 * | 10/2016 | | B64C 39/024 |
| WO | WO 2017/062418 | | 4/2017 | |
| WO | WO 2021/188274 | | 9/2021 | |

OTHER PUBLICATIONS

"Rasmussen, S; Kingston, D; Development and Flight Test of an Area Monitoring System Using Unmanned Aerial Vehicles and Unattended Ground Sensors; Jun. 2015; 2015 International Conference on Unmanned Aircraft Systems (ICUAS)" (Year: 2015).*

ASYLON, "The Future of Perimeter Security: DroneCore/O.W.L. Integration", YouTube, Dec. 5, 2018, retrieved on Apr. 17, 2021. Retrieved from the internet <URL: https://www.youtube.com/watch?v=6njdLC5BY3k> entire video.

Alnuaimi, Ohood et al. "Persistent surveillance with small Unmanned Aerial Vehicles (sUAV): a feasibility study" vol. 10796, Electro-Optical Remote Sensing XII; SPIE Security + Defence, 2018, Berlin, Germany.

Hosseini, Nozhan et al. "UAV Command and Control, Navigation and Surveillance: A Review of Potential 5G and Satellite Systems" IEEE Aerospace Conference Mar. 2019, pp. 1-10.

Michini, Bernard et al. "Automated Battery Swap and Recharge to Enable Persistent UAV Missions." Infotech@Aerospace 2011. American Institute of Aeronautics and Astronautics, 2011, pp. 1-11.

Yanmaz, Evsen et al. "Drone networks: Communications, coordination, and sensing" Ad Hoc Networks 68, pp. 1-36, Oct. 2, 2017.

* cited by examiner

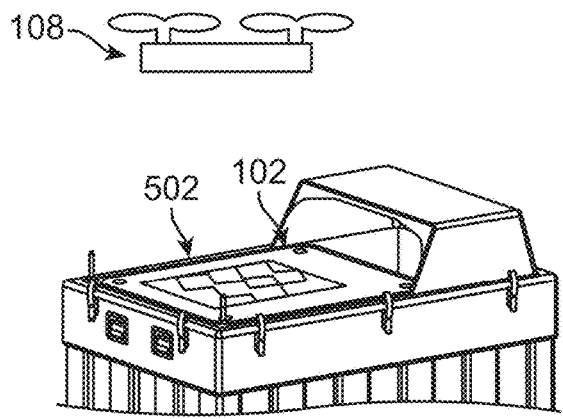
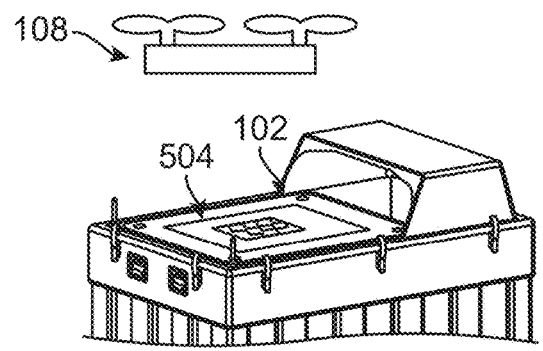
FIG. 5A  FIG. 5B
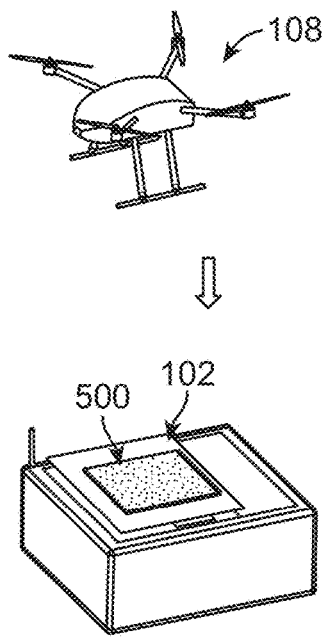
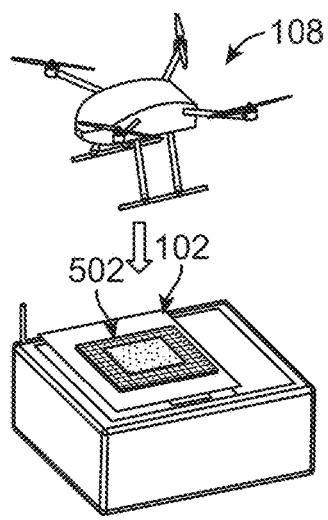
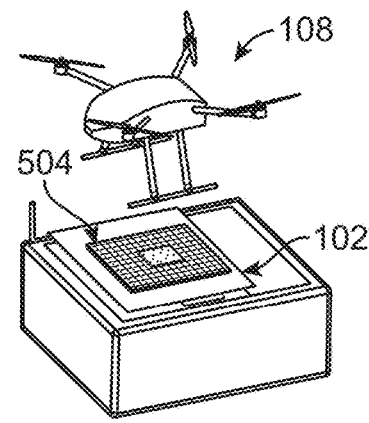
FIG. 5C  FIG. 5D  FIG. 5E

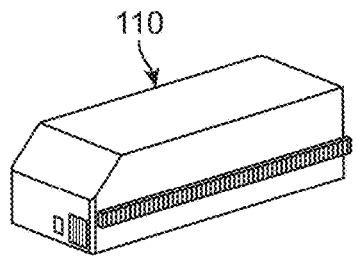
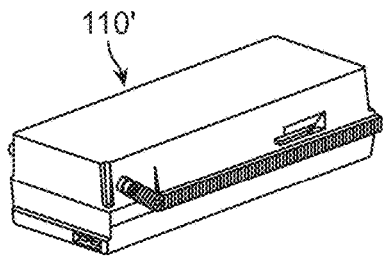
FIG. 8A      FIG. 8B
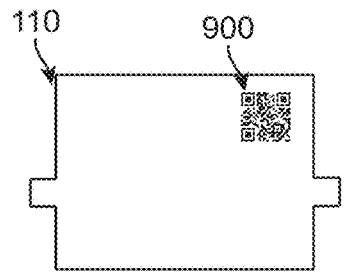
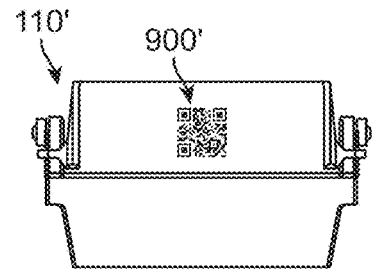
FIG. 9A      FIG. 9B
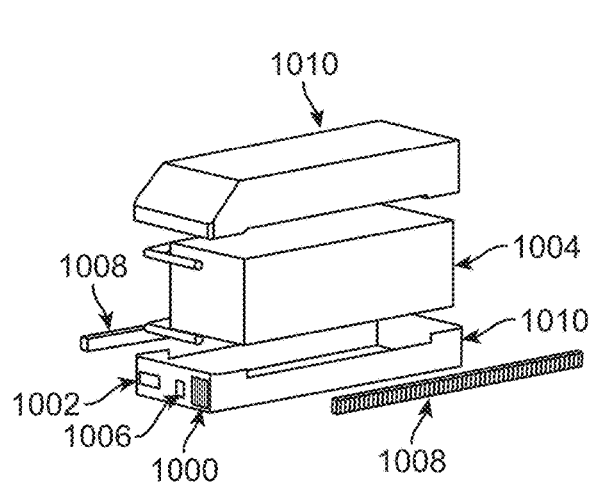
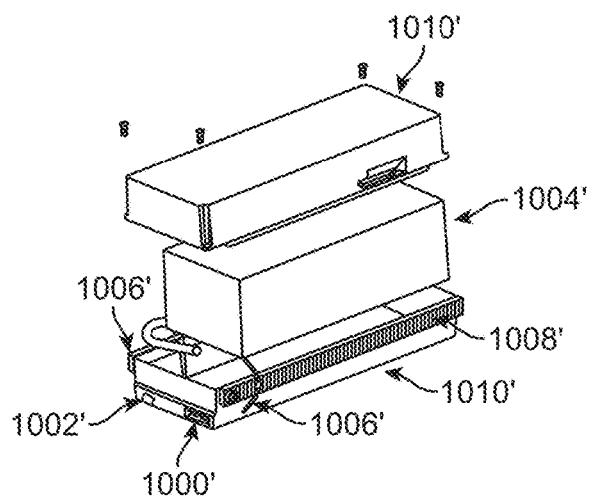
FIG. 10A      FIG. 10B

AUTOMATED ALERT SYSTEM USING UNMANNED AERIAL VEHICLES

CROSS-REFERENCE TO RELATED APPLICATIONS

This application claims the benefit of priority to U.S. Prov. App. 62/990,205 filed Mar. 16, 2020, which is incorporated herein by reference in its entirety.

BACKGROUND OF THE INVENTION

Unmanned Aerial Vehicles (UAVs) are increasingly being used for commercial applications. Examples include, but are not limited to, inspections of railway lines, inspection of electrical power lines, monitoring of quarry sites and construction sites. Larger than consumer UAVs, commercial UAVs are commonly powered by, but not limited to, batteries. Currently, the primary limitation of the range and capabilities for commercial UAVs is battery technology. With the latest breakthroughs and higher power densities, UAVs are capable of up to around 30 minutes of flight with a useable payload. Current UAVs require manual exchange of said power systems, requiring a man in the loop for every flight.

In addition to a power limitation, certain activities such as surveillance or security require a high level of vigilance but a limited number of UAVs and/or operators are another limitation in monitoring physical areas, particularly far-ranging areas or areas with a large number of obstructions.

Hence, a UAV system having autonomous power supply replacement capabilities which can be used with automated remote sensing capabilities is desirable.

SUMMARY OF THE INVENTION

In utilizing any of the UAVs described herein, one particular application may include a protocol where data is sent via any number of wireless transmission protocols (e.g., electrical, electromagnetic, optical, etc.) from a separate and distinct sensing system which is triggered or actuated in order to initiate a predetermined flight protocol for the UAV depending on the event which is triggered or actuated. The separate sensing system may include, but is not limited to, radar, cameras, proximity sensors, or other sensing technologies such as an electric fence which are positioned at a predetermined location for performing certain activities such as monitoring or observing that location, identifying any potential static or dynamic hazards within that location for obstacle avoidance or for reporting back to an operator, identifying a particular location requesting delivery of, e.g., a parcel, etc.

As the sensing system is monitoring the predetermined location, the system may transmit data upon detecting an anomaly in the location. This data may be used to trigger the flight system of the UAV, e.g., to move the UAV to a new position and/or use onboard sensors or other non-flight systems to conduct a specified or predetermined task. Additionally, the pairing of an external, third-party sensor would allow for automated validation of a remote detection without the need of a human to aid in false alarm reduction, while also reducing response times.

Any of the UAVs or UAV systems described herein or in U.S. Pat. Nos. 9,969,285 and 9,783,075 and U.S. Pat. Pub. 2018/0222339 may be used with the sensing system described herein. Each of these patents or patent applications are incorporated herein by reference in its entirety and for any purpose. Furthermore, the features and components described herein are not limited to the specific embodiments described in the references nor are they limited to the specific embodiments as described herein.

The Reconfigurable Power Station (RPS) for Multiple UAVs is designed to extend the range and capabilities of multiple, and possibly disparate, unmanned systems. In this embodiment we discuss in detail the RPS system when interfacing with UAVs. The RPS system will detect a signal from a UAV requiring a new Swap Cartridge (SC), and using identifiers, including vehicle type, vehicle SC, status of SC, and vehicle location, will make a determination for landing. As the vehicle closes to within a threshold distance of the RPS, which may include, but are not limited to 1 foot, 3 feet, 6, feet, 10 feet, 20 feet, etc. above the station, the UAV will be guided to the RPS utilizing sensors embedded into the Universal Integrated Swap system (UIS) onboard the vehicle and a series of visible or non-visible illuminators embedded into the landing zone deck to make final approach and land. Once landed, the RPS will deploy a landing gear retention system to mechanically and electrically connect to it. This is but one embodiment of the RPS as this problem is not limited to UAVs, but to many forms of unmanned systems, including, but not limited to, ground vehicles, underground vehicles, water surface vehicles, underwater vehicles, and space vehicles.

The RPS System is designed to house multiple power cartridges, in one or multiple modular power bays. These modular power bays are designed to be self-contained housing and replenishment units. Modular Power Bays (MPBs) are capable of housing multiple types and sizes of SCs, and may include, but not limited to, electric batteries, hydrogen fuel-cells, or fossil fuels. The data the RPS received prior to the UAV landing may enable the onboard processing system to make a determination and select the appropriate type and quantity of SCs. Utilizing a transfer system coupled with an elevator, SCs are transferred from the MPBs to the landing zone. An example embodiment of the described system is: The SC transfer mechanism moves to locate the UIS on the landed UAV. Once located, the swapping mechanism withdraws the depleted SC from the system and moves the SC to an available MPB, inserting it for replenishment. Following the transfer of the SC, the swapping mechanism moves to a bay with the appropriate replacement SC for the UAV, as directed by the onboard processing system, and retrieves a fully energized SC. From there it will be elevated to the landing zone via an elevator or other mechanical actuation system. Once the swapping mechanism locates the UIS, it inserts the energized SC into the Swap Cartridge Receptacle (SCR) onboard the UAV. With the SC swap complete and the swapping mechanism stored below the landing zone deck, the UAV departs the RPS and resumes its flight.

In one embodiment, a power station for unmanned aerial vehicles may generally comprise an enclosure defining a surface and an interior, and a landing zone positioned upon the surface and sized to receive one or more UAV types, wherein the landing zone has one or more markers or emitters configured to generate one or more composite images when a UAV is in proximity to the landing zone.

In another embodiment, the reconfigurable power station for unmanned aerial vehicles may generally comprise a housing defining a surface, a modular power bay positioned within the housing, the modular power bay defining one or more receiving bays for retaining a corresponding power cartridge, a landing zone positioned upon the surface and sized to receive one or more UAV types, wherein the landing zone has one or more markers or emitters configured to generate one or more composite images when a UAV is in proximity to the landing zone, and a central processor in communication with the one or more markers or emitters.

One method of swapping a power supply in an unmanned aerial vehicle may generally comprise emitting one or more composite images to a UAV via one or more markers or emitters when the UAV is in proximity to a landing zone located on a reconfigurable power station (RPS), determining an orientation of the UAV relative to the landing zone after the UAV has landed, removing a first swap cartridge from the UAV via a swapping mechanism within the RPS, and installing a second swap cartridge from the RPS and into the UAV.

In yet another embodiment, a UAV reconfigurable power station (RPS) may generally comprise a dynamic terminal landing system (DTL) configured to support autonomous landing of a UAVs on a landing zone, wherein the DTL comprises a UAV landing zone that is reconfigurable for multiple UAV types and sizes and is further configured to support landing, exchanging a swap cartridge, and take-off operations; a power source capable of powering a UAV flight system once on the landing zone; one or more modular power bays (MPBs) capable of housing multiple instances of a given universal swap cartridge (SC); a universal swap cartridge swapping mechanism configured for manipulating multiple SC types and sizes; a RPS central processor (CP) configured to support operations of the RPS; and a sensor positioned within the RPS.

Additionally, the RPS may further comprise a universal swap cartridge processor (USP) configured to interact with the RPS; one or more universal swap cartridge receptacles (SCRs) configured to mechanically and electrically connect a SC to a UAV; one or more SCs; and an external marker positioned on the SC that allows the RPS to determine a position of the SC after the UAV has landed to allow for swapping of a depleted SC.

In yet another embodiment, a UAV reconfigurable power station (RPS) may generally comprise a UAV landing zone that is reconfigurable for multiple UAV types and sizes and is further configured to support landing, exchanging a swap cartridge, and take-off operations; a dynamic terminal landing system (DTL) configured to support autonomous landing of UAVs on a landing zone; a power source capable of powering a UAV flight system once on the landing zone; one or more modular power bays (MPBs) capable of housing multiple instances of a given universal swap cartridge (SC); a universal swap cartridge swapping mechanism configured for manipulating multiple SC types and sizes; a RPS central processor (CP) configured to support operations of the RPS; and sensors positioned within the RPS.

Additionally, the RPS may further comprise a universal swap cartridge processor (USP) configured to interact with the RPS; one or more universal swap cartridge receptacles (SCRs) configured to mechanically and electrically connect a SC to a UAV; one or more SCs; and an external marker positioned on the SC that allows the RPS to determine a position of the SC after the UAV has landed to allow for swapping of a depleted SC.

Additionally, the RPS may also further comprise a landing zone having visible or non-visible markers to create a composite image to aid in the landing of the UAV; and a composite image utilizing visible or non-visible illuminators on or embedded in the landing zone which are configured to form scalable composite images in response to a UAV type and altitude above the RPS landing zone. Aside from visible or non-visible illuminators, other communication methodologies between the RPS and the UAV may be utilized instead, e.g., radio-frequency, microwave, etc. for facilitating the landing of the UAV.

In yet another embodiment a Universal Swap Cartridge Processor (USP) may generally comprise a housing configured to be integrated into a UAV flight controller or airframe; a processor within the housing and configured to control an automated landing and launch of a UAV from an RPS; an external transmitter capable of wirelessly transmitting a power source health and identifying data of an SC to the RPS, other UAVs in proximity, or other ground stations; an external receiver capable of wirelessly receiving data from the RPS, other UAVs in proximity, or other ground stations, wherein the USP is configured to relay data to a UAV or UAV flight controller; and one or more cameras configured to capture visible and/or non-visible data from a landing zone located on an RPS.

BRIEF DESCRIPTION OF THE DRAWINGS

The detailed description is described with reference to the accompanying figures.

FIGS. 5a-5b are perspective views of the dynamic terminal landing system in accordance with embodiments.

FIGS. 5c-5e are perspective views of another variation of the dynamic terminal landing system (DTL).

FIGS. 8a-8b are perspective views of example embodiments of an assembled SC.

FIGS. 9a-9b are rear views of example embodiments of an external marker fixed to the surface of an SC.

FIGS. 10a-10b are exploded views of example embodiments of an SC.

DETAILED DESCRIPTION OF THE INVENTION

In incorporating a sensing system with a UAV, the response system described herein may include the UAV, an autonomous battery swap station, and a command-and-control interface which may allow for a user to operate the UAV and battery swap station. The command-and-control interface may be an optional cloud-based interface which can support integration with various internet-of-things (IoT) and other similar devices which may enable the user to receive various alarm notifications which may be triggered by a sensing system remotely located from the UAV and/or swap station.

Any of the UAVs or UAV systems described herein or in U.S. Pat. Nos. 9,969,285 and 9,783,075 and U.S. Pat. Pub. 2018/0222339 may be used with the sensing system described herein. Each of these patents or patent applications are incorporated herein by reference in its entirety and for any purpose.

The following is a detailed description of an embodiment of the invention, as well as the systems and methods utilized in order to provide extended capabilities to UAVs. It is understood that the various embodiments of said invention are considerate of the functional capabilities of various UAV scales and frames. An example would include proportionally smaller aerial vehicles that have varied acceptable flight conditions for safe operation. In consideration of the device having universal applications, the parts and complexity of the associated system may vary depending upon the applied platform. Other embodiments of the RPS 100 system may be able to fulfill a similar role to the embodiment described here with respect to other unmanned systems, including but not limited to, surface vehicles, underground vehicles, water surface vehicles, underwater vehicles, and space vehicles.

Figure 1A:
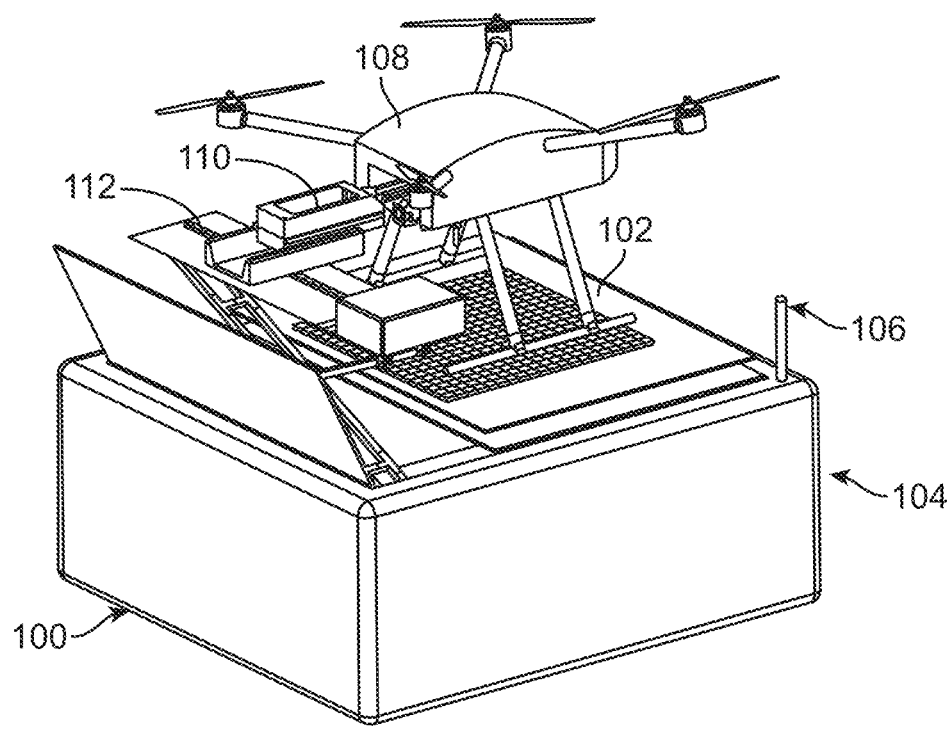
FIG. 1a is a perspective view of one embodiment of the Reconfigurable Power Station (RPS) including an unmanned aerial vehicle (UAV) in use of the station.

The utilization of a reconfigurable power system in this embodiment, as shown in the perspective view of FIG. 1a, is intended to extend effective flight range and flight time of a desired UAV 108 by offering a universal system in which UAVs 108 are capable of exchanging depleted universal Swap Cartridges (SCs) 110 for energized cartridges. One variation of a SC 110 may comprise a power supply or power cartridge in which a depleted power cartridge may be exchanged for an energized power cartridge. The various embodiments of SC 110 are not intended to be limiting as various other types of payloads may be utilized as swappable cartridges. The Reconfigurable Power System (RPS) 100 is intended to be a fully autonomous solution for SC 110 exchange. The RPS, which is capable of communications with the UAV 108 via the Universal Integrated Swappable system (UIS) 300 installed aboard the UAV 108, may be contained within a housing or an environment enclosure 104 and will detect whether the user or mission control of said UAV 108 determines the desire for exchange of a SC 110 and will engage the UAV 108 into the SC 110 exchange protocol.

In the considered embodiment of the RPS 100, one can be comprised of, but not limited to, a UAV landing zone 102 configurable for a multitude of UAV types and sizes, a dynamic terminal landing system (DTL) for autonomous UAV landing, a power source capable of powering the UAV flight control system when landed 600 (as described in further detail in FIG. 6 herein), a modular power bay (MPB) 700 which may house multiple SCs 110, a universal SC swapping mechanism 112 to advance the exchange of multiple SCs 110, a central processor 218, and associated sensors 222 allowing appropriate tracking/detecting of the UIS 300 aboard the UAV 108, as described in further detail below. The swapping mechanism 112 may be contained within the environment enclosure 104 when not in use but may be deployed through an opening door or mechanism and automatically positioned into proximity to the UAV 108 when swapping the SC 110. An RPS 100 may be deployed in any number of environments 200 of which include, but are not limited to, farms, fields, deserts, industrial plants, water banks, and urban zones. The RPS 100 may be controlled directly in close physical proximity or remotely. A transmitter and receiver 106 may be integrated with the RPS 100 to facilitate wireless communications, e.g., with the UAV 108 or with a remotely located controller or interface. An internal power source 206 allows for operations without an external power source 202 for a set period of time. RPS 100 may have provisions for various types of external power 202 including, but not limited to: electrical grid, hydrocarbon generator, or solar power.

Figure 1B:
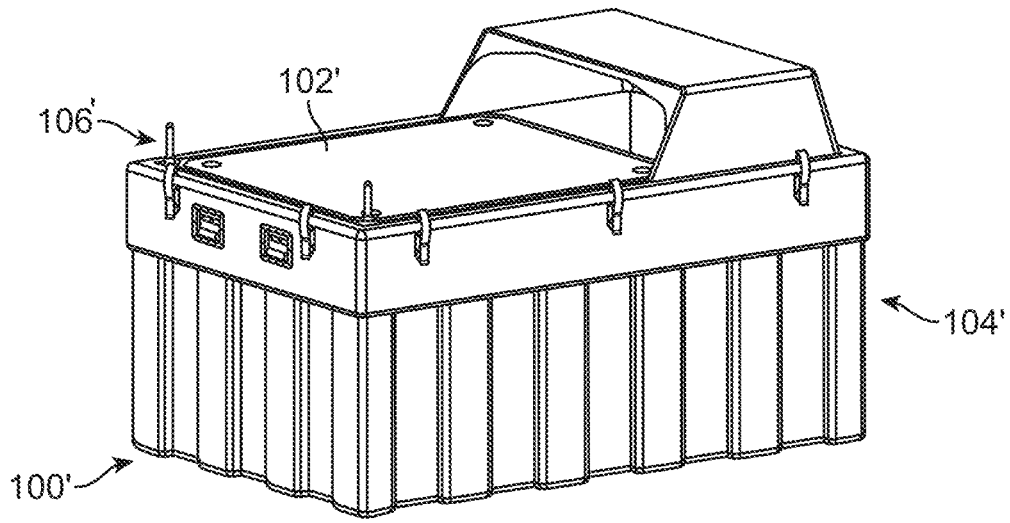
FIG. 1b is a perspective view of another embodiment of the RPS.

FIG. 1b illustrates a perspective view of another embodiment of an RPS 100' which may also incorporate the housing or environment enclosure 104'. The UAV landing zone 102' may be positioned atop the enclosure 104', as above, and the enclosure 104' may also incorporate a transmitter and receiver 106 to facilitate wireless communications. While the RPS 100 described above incorporates a landing zone 102 and a swapping mechanism 112 deployable from within the enclosure 104, the RPS 100' embodiment may incorporate the swapping mechanism in a housing which is positioned or positionable adjacent to the UAV landing zone 102'.

Figure 3A:
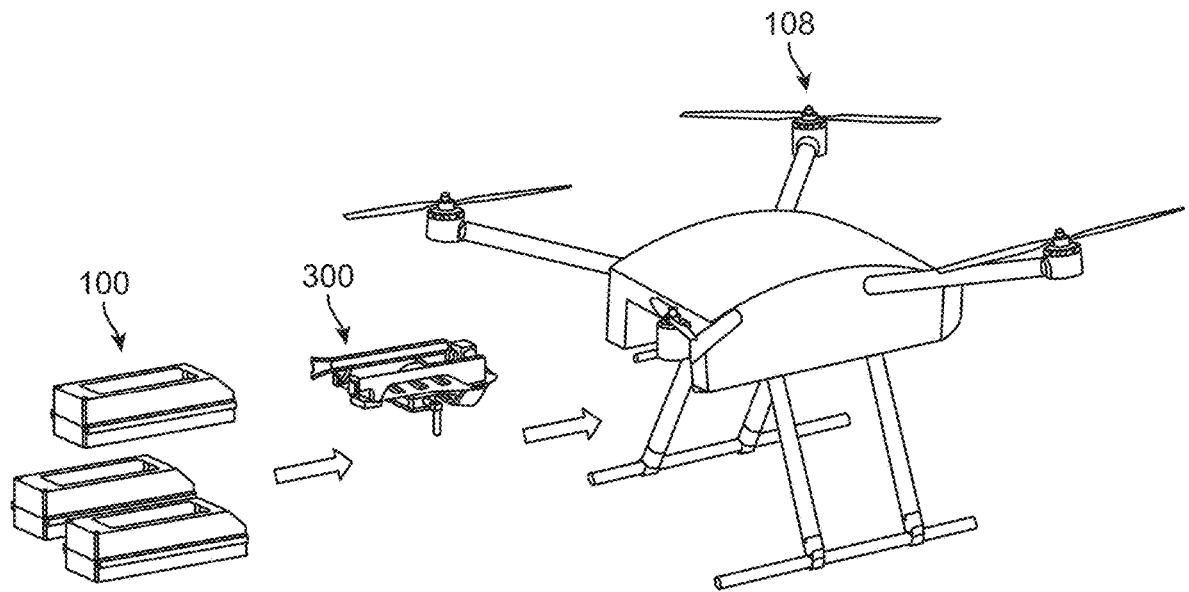
FIGS. 3a-3b are illustrations of an embodiment of a Universal Integrated Swap System (UIS) for an unmanned aerial vehicle embodiment.
Figure 3B:
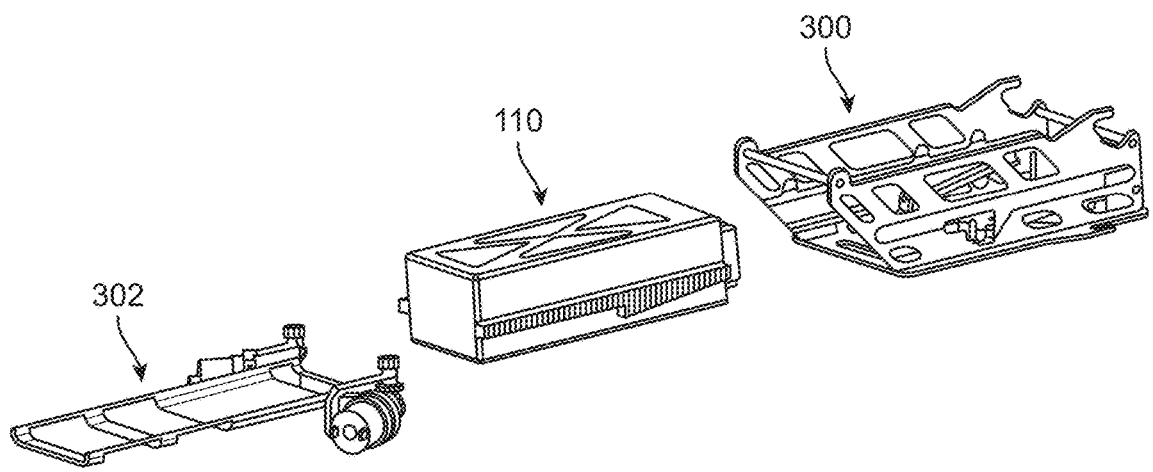
Figure 11:
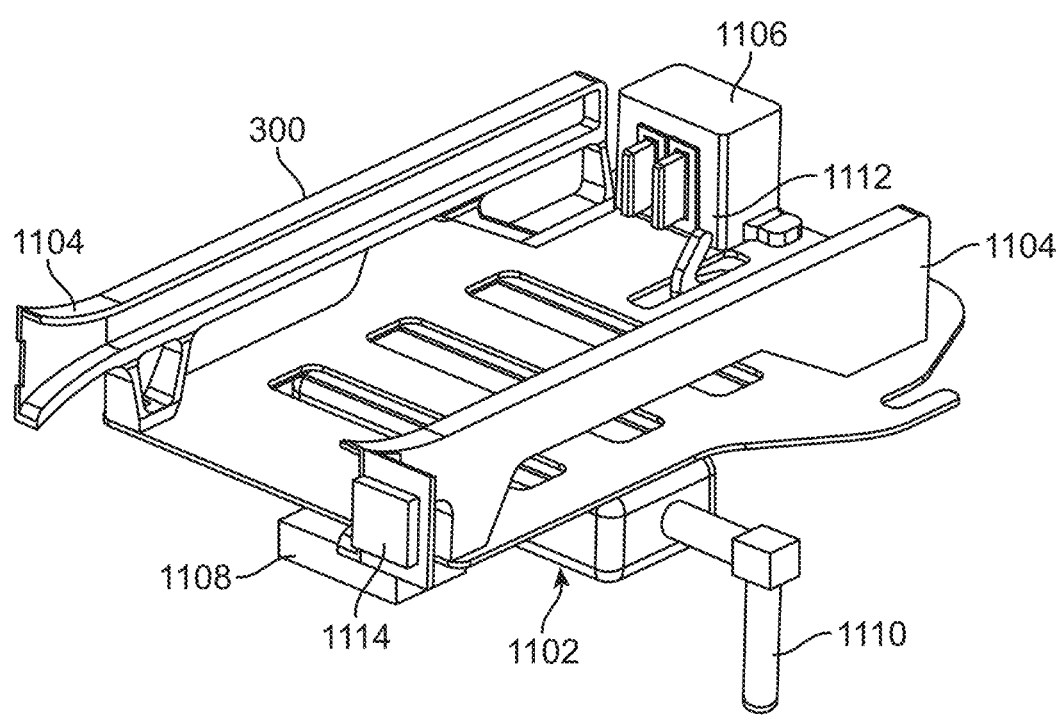
FIG. 11 is a perspective view of a Universal Integrated Swap system (UIS) and associated features in accordance with embodiments.

The aforementioned UIS 300, which is illustrated as an assembly in FIG. 11, is adaptable or otherwise securable to the independent frame of the UAV 108 utilizing the capabilities of the RPS 100. The assembly of the UIS 300, in one embodiment, may be implemented as illustrated in the perspective views of FIGS. 3a and 3b. As shown in FIG. 3a, the UIS 300 is illustrated in an assembly view relative to the UAV 108 and multiple SCs 110 are also shown as being insertable or attachable within the UIS 300. As illustrated in the assembly view of FIG. 3b, the UIS 300 (shown detached from the UAV 108 for illustrative purposes), generally forms a receiving structure having a universal Swap Cartridge Receptacle (SCR) 1104 which may have one or more receiving guides defined. A SC swapping adapter 302 (and described in further detail below) may be deployed from the RPS 100 while carrying a SC 110. When the UAV 108 has landed upon the platform 102 and is ready to receive a SC 110, the SC swapping adapter 302 and SC 110 may be aligned with the receiving channel of the UIS 300 which may then receive the SC 110 for electrical coupling.

Included as part of the UIS 300 assembly may be a Universal Swap Processor (USP) 1102, one or more SCRs 1104, one or more SCs 110, and an external marker 1114 for identification and tracking of the UIS 300, as further shown in FIG. 11. A UIS 300 may be directly integrated into a given UAV 108 structure by an Original Engineering Manufacturer (OEM) or adapted to an existing UAV 108 structure. An example embodiment of a directly integrated UIS 300 may have the SCR 1104 merged with the primary structure, the UPP 1102 part of the flight controller board, and the optical sensor 1108 integrated directly into the exterior of the vehicle. A UIS 300 is utilized by the UAV 108 for interaction and SC 110 swapping with an RPS 100. Furthermore, the USP 1102 may comprise one or more cameras which are configured to capture the visible and/or non-visible data (e.g., one or more composite images which are scalable) transmitted from the landing zone 102. Aside from visible or non-visible illuminators, other communication methodologies between the RPS and the UAV may be utilized instead, e.g., radio-frequency, microwave, etc. for facilitating the landing of the UAV. Within a UIS 300, SCR(s) 1104 may be electrically connected to the USP 1102 to provide SC data including, but not limited to, SC health, SC power status, SC payload status, and SC type. The previous embodiment is capable of being powered by the embedded battery that is a part of the USP 1102 while SC(s) 110 are not installed in the system.

The aforementioned universal Swap Cartridge (SC) 110, which is illustrated in the variations of FIGS. 8a and 8b, is compatible with the associated UIS 300 and provides power or payload to the equipped UAV 108. The variation shown in FIG. 8a may incorporate a housing or external sleeve 1010 having a tapered portion while the variation shown in FIG. 8b may have a housing or external sleeve 1010' which is non-tapered. The SC 110 is designed, but is not limited, to provide power to the equipped UAV 108 propulsion system. An embodiment as shown in FIGS. 8a and 8b could include one or more power and/or signal connectors 1000, programmable storage and data mediums 1002, desired power storage medium, desired payload, paired tracks 1008 for mating with and removal from the UIS 300, unique identifiable marker 900, and mechanical locking mechanism 1006. The end views of FIGS. 9a and 9b illustrate the unique identifiable markers 900, 900' (e.g., 2-dimensional or 3-dimensional barcodes, etc.) positionable upon the external housing for optical reading and recognition. The paired tracks 1008 which are positioned along the sides of the housing or sleeve 1010 and extend longitudinally may be comprised of one or more projections (such as a rack gear) for providing traction when received by the SCR(s) 1104 of the UIS 300.

Primary construction of a SC 110 is defined as a housing or an external sleeve 1010 that houses the desired medium 1004, which includes but is not limited to, battery, fossil fuel, fuel cell, or payload, as shown in the exploded assembly view of FIGS. 10a and 10b. Additionally, SCs 110 may contain more than one power medium 1004 within the case to be able to facilitate more alternative systems, including but not limited to, hybrid propulsion systems. The connectors 1000 integrated into the SC 110 is electrically connectable to the electrical connectors 1106 positioned within the UIS 300 (as shown in FIG. 11) and when connected will be able to transfer power or applicable data that is unique to the individual SC 110. This information may include: power source data, power sources specification, power sources health data, payload status, payload data, UAV type, compatibility type, serial numbers, product numbers, and/or owner. The SC 110 may contain a unique marker 900 which stores pre-programmed information. This pre-programmed information may assist identifying the type and compatibility of the observed SC 110. Furthermore, the marker 900 may assist in the location of one or more SCs 110 and removal of said SCs 110 from the landed UAV 108. The SC 110 may alternatively house internal markers, such as RFID tags, acting similarly to the aforementioned unique external marker 900. Data pulled from the SC 110 may be stored locally at the RPS 100 and may be used internally by the RPS 100 system in operation and/or accessed remotely by an operator or external system.

Unique external features, such as smooth rails or racks 1008, are implemented to allow facilitation of installation, storage, and removal of said SCs 110. In order to ensure proper containment, provisions, such as, but not limited to, a physical interface may be implemented for mechanical locking of individual SCs 110 within the UIS 300 during flight of a UAV 108, landing of a UAV 108, UAV 108 resting on stationary or mobile platform, or storage within a modular power bay. A SC 110 may be a variety of sizes to accommodate the variety of UAV designs and types. Upon an external power source supplied to a RPS 100, a SC 110 housed in a MPB 700 will be energized to nominal conditions. Said energized SC 110 may remain physically constrained and may be stored in nominal conditions. The embodiment in FIG. 10b shows components which are numbered similarly with corresponding components as shown in FIG. 10a.

The aforementioned universal Swap Cartridge Receptacle (SCR) 1104, which is illustrated in FIG. 11, is compatible with all proposed SC 110, MPB 700, and UIS 300 components. The SCR 1104 may be comprised of, but is not limited to, a positive mechanical solution for mechanical containment of SCs 1112, electrical connectors 1106 for transmission of power and/or signal transmissions of associated SCs 110, and physical features to accommodate various UAV styles and sizes. A SCR 1104 may be responsible for supplying power from a connected SC 110 to a UAV 108. A SCR 1104 is responsible for mechanically retaining a SC 110 during all modes of flight. A single or multiple instances of a SCR 1104 may be used on a single UAV 108.

The aforementioned USP 1102, which is illustrated in FIG. 11, is compatible with associated UISs 300 and SCs 110. A USP 1102 may be composed of, but is not limited to, a processor to facilitate communication between RPS 100 and UAV 108, an external electromagnetic transmitter 1110 capable of system and SC data transfer, an external receiver 1110 capable of communication with one or more RPSs 100, UAVs 108s in proximity, and/or other stations, a relay for commands from pilot to flight controls and vice versa, one or multiple sensors for visible and/or non-visible data from RPS 100 or environment, and an embedded battery to facilitate system functions independent of the SC 110. Aside from visible or non-visible illuminators, other communication methodologies between the RPS and the UAV may be utilized instead, e.g., radio-frequency, microwave, etc. for facilitating the landing of the UAV. A USP 1102 utilizes a wireless protocol to communicate with an RPS 100, and is designed to transmit data, which may include SC health data, SC type, and payload data. The USP 1102 may act as a pass-through for flight input data between external sources and the flight controller on a UAV 108. A UPP 1102 system may be designed to be installed on multiple UAV 108 types and multiple UAV 108 sizes. These installations may be directly integrated into the UAV 108 frames.

Figure 6:
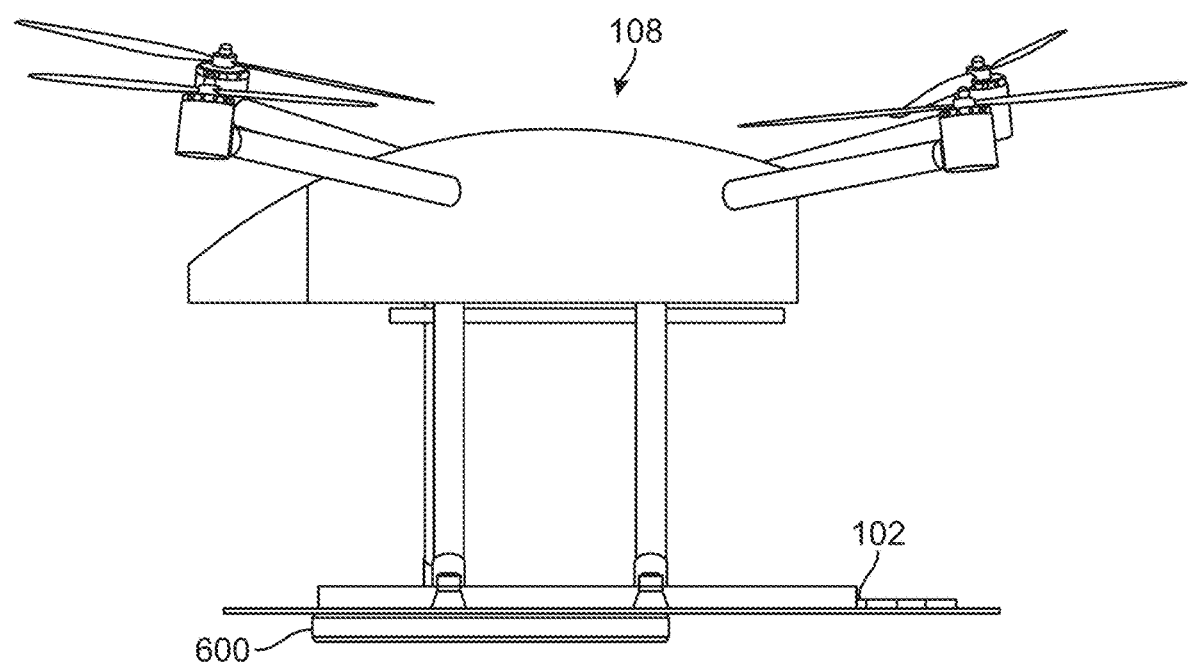
FIG. 6 is a side view of a shore power system supplying power to a landed UAV in accordance with embodiments.

The aforementioned Landing Zone 102, which is illustrated in the side view of FIG. 6, is designed for the purpose of physically supporting and restraining a UAV 108 while landed at an RPS 100 during a SC 110 exchange. It may be designed to secure a UAV 108 for a period of time via one or more mechanical retaining mechanisms which may temporarily attach or otherwise secure the UAV 108 during swapping of the SC 110, e.g., via securement with the landing gear of the UAV 108. The landing zone 102 is designed to supply power to the UAV 108 during the SC 110 exchange, including but not limited to, powering flight control systems and payloads via the UIS 300 which may be done through an electrical and/or mechanical engagement mechanism 600. The landing zone 102 may accommodate one or more UAVs 108s simultaneously. The RPS 100 may have one or more landing zones 102.

The aforementioned Dynamic Terminal Landing system (DTL), which is illustrated in FIGS. 5a to 5e, may be comprised of, but not limited to, landing deck(s) 102 and one or more visible or non-visible markers/emitters 500, 502, 504 capable of generating composite images. This system of markers may be arranged in patterns or arrays that allow the system to create identifiable imagery. The composite imagery can be superficial or embedded into the landing deck 102, of which may or may not be a smooth or textured surface to aide in landing. The composite imagery size are scalable and may vary from, e.g., 1 inch by 1 inch and be as large as 26 inches by 26 inches, or larger. For example, a composite image may be a QR barcode or AprilTag. Depending upon a UAV's 108 location above a RPS 100, the composite image may change its size (e.g., in real-time) to aide in the landing of the UAV 108 depending on the distance to the UAV 108, as shown in the perspective view of FIGS. 5a and 5b, which shows a predetermined pattern upon the landing zone 102 which may be reduced in size in a corresponding manner as the UAV 108 approaches the landing zone 102. These distances may include, but are not limited to, e.g., 1 foot, 3 feet, 6, feet, 10 feet, 20 feet, etc. above the station. Dependent upon the drone type and size, the image displayed for landing may change to optimize the landing of said vehicle. Dependent upon the height of the system, the composite images may move in addition to vary in size in aiding in the landing of the UAV 108. The DTL is capable of operating on the internal power of the RPS 100. Similarly, FIGS. 5c to 5e illustrate how the visible or non-visible markers/emitters 500, 502, 504 may change its pattern and/or change in size as the UAV 108 approaches the landing zone 102.

Figure 7A:
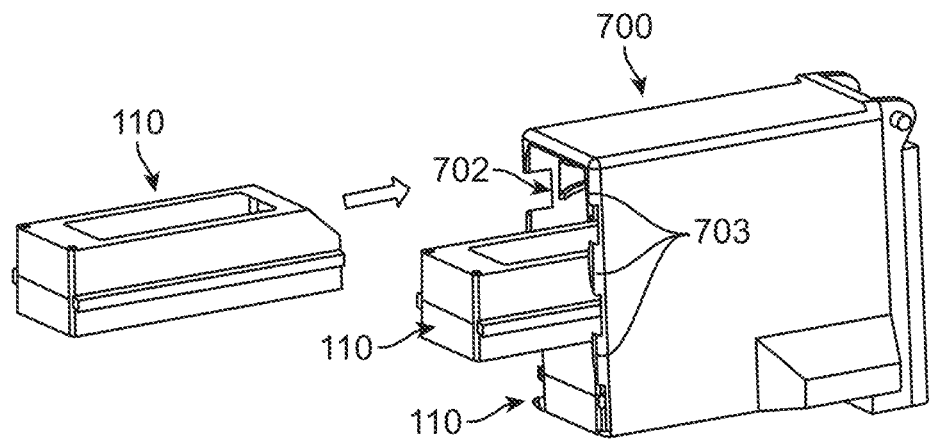
FIGS. 7a-7b are perspective views of example embodiments of a modular power bay and associated SCs.
Figure 7B:
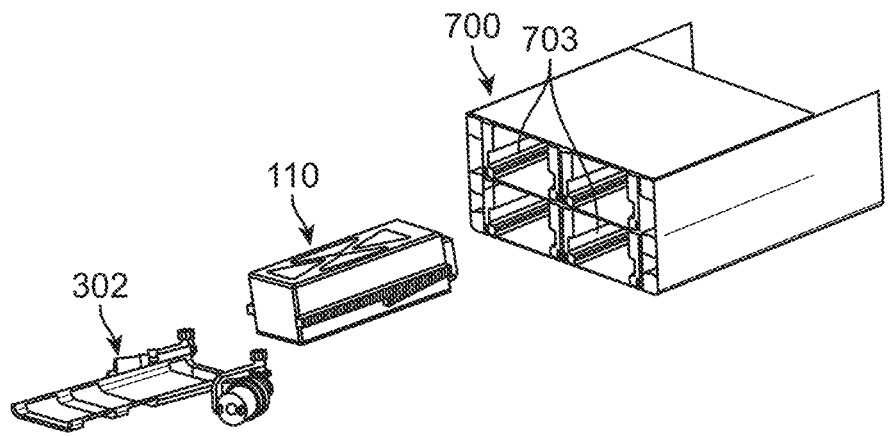

The aforementioned Modular Power Bay (MPB) 700, which is illustrated in FIGS. 7a and 7b, is capable of housing multiple instances of SCs 110 within itself for storage or replenishment and is stored within the RPS 100. Universal Swap Cartridge Receptacle (SCR) 1104 installations within the MPB 700 allow for SCs 110 to be utilized similarly as the UIS 300. A MPB 700 may contain a homogenous or heterogeneous mixture of SC types and may contain one or more SCs 110 at any point in time. MPBs 700 are defined as line replaceable units (LRUs), which allow for one or more MPBs 700 to be transported, installed, or utilized within one or more RPS 100s. With the MPB 700 being an LRU, it allows for variable SC 110 storage within a RPS 100, thus providing the possibility of servicing a multitude of UAV 108 types and sizes from the same or joined network of RPS 100s. Utilization of a MPB 700 separate from the box can allow for standalone transportation and servicing of SCs 110 or MPBs 700. Furthermore, the MPB 700 may be configured to store the one or more SCs 110 in various configurations. For instance, FIG. 7a shows one variation where the MPB 700 may be configured to store the SCs 110 in a stacked manner where the individual receiving bays 703 may be positioned atop one another. FIG. 7b shows a perspective view of another arrangement where the receiving bays 703 of the MPB 700 may be aligned in a symmetric arrangement, for example, in a two-by-two arrangement as shown. Depending on the positioning of the receiving bays 703, the SC swapping adapter 302 may be positioned in proximity to the appropriate bay 703 for storage or retrieval of an SC 110.

The aforementioned SC Swapping Mechanism 112, which is illustrated in FIG. 1, may be adjustable to receive a multitude of SCs 110, which may be used with a multitude of UAV 108 sizes and types. The swapping mechanism 112 may be implemented with an array of sensors or detectors to allow for the determination of the UIS 300 location. The capabilities of said mechanism 112 permit the exchange of one or more SCs 110. The exchange of SCs 110, via the swapping mechanism 112, is facilitated between one or more depleted SCs 110 of a UAV 108. Said depleted SCs 110 may be exchanged with one or more of any desired replacement SCs 110, of which are stored within the MPBs 700 of the RPS 100. The swapping mechanism 112 may facilitate motion for transfer with inertia of a depleted SC 110. The swapping mechanism 112 is also capable of facilitating SC swap via an elevating system or another mechanical solution. The swapping mechanism 112 may facilitate advancement of a SC 110 with the motion of a rotary system. This system allows for the removal and loading of a SC 110 into a UIS 300 and a MPB 700. The RPS 100 that the swapping mechanism 112 is housed within is capable of facilitating SC exchange of the UAV 108 while it is positioned and at rest on an associated DTL.

Figure 2A:
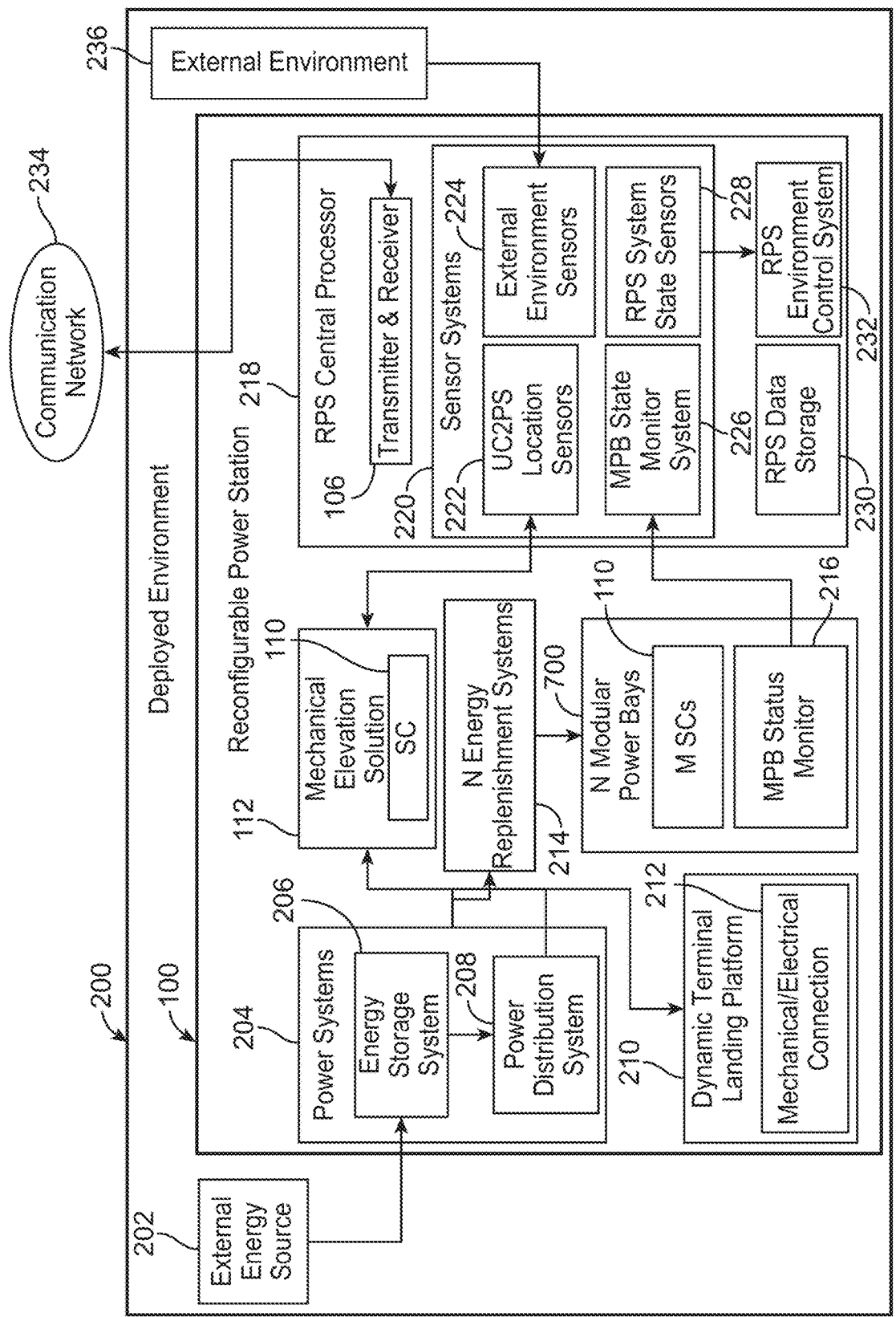
FIGS. 2a-2b are schematic illustrations of a block diagram of subsystems that constitute an example embodiment of a RPS.

The aforementioned Reconfigurable Power System Central Processor (RPS-CP) 218 is utilized within the RPS 100 to facilitate the system functions of the RPS 100, as shown in the schematic diagram of FIG. 2a. These functions may include, but are not limited to, external/internal environmental monitoring 224, environmental control system (ECS) control 232, UIS data transfer, RPS data storage 230, safety systems control, and MPB and SC state monitoring 226. RPS-CP primary function is to coordinate and execute the swapping of SCs 110 for a UAV 108 as described in FIG. 4.

During normal operations of an RPS 100, the RPS-CP may be observing environmental conditions. These conditions include both conditions within/on the RPS 100 and conditions about/around the RPS 100. The conditions around the deployed RPS 100 that may be monitored could include, but are not limited to, ambient temperature, ambient pressure, ambient wind speed, ambient wind direction, ambient humidity, and visibility. These conditions, in accordance with predetermined limitations for the UAV 108, may determine the flight readiness of the UAV 108 for a mission at any given time. The conditions detected by the RPS 100 and the vehicle of which is to be deployed or stationed may be communicated via the RPS-CP to the UAV 108, the RPS 100, and/or a command center determined preferred by the user. The flightworthiness determination of any specific UAV 108 or its mission may be communicated via the RPS-CP to a mission planner or a central command center. Within the RPS 100, the RPS-CP will be observing various environmental conditions in order to provide ideal operating and storage conditions of all the functioning systems that may be enclosed within an RPS 100.

In accordance with all aforementioned, and any more appropriate installed systems, the system observed data monitored by the RPS-SC may be retained in an internal storage medium 230. This data storage medium may be located within the RPS 100 or in communication of the RPS 100. Communications with the RPS 100, with any form of desired data network or any connected device, wired or wireless, may be conducted via a transmitter and receiver 106 on board the RPS 100. This transmitter and receiver 106 may be controlled via the RPS-CP to access desired information from the RPS 100 and all its associated systems.

Generally, the RPS 100 can be seen in the schematic illustration of FIG. 2a showing an example of the RPS 100 within a deployed environment 200. The RPS 100 may be in electrical communication with an external energy source 202 which may charge or power an internally contained energy storage system 206 which is contained within the power system 204. The energy storage system 206 may distribute power via a power distribution system 208 to the various components within the RPS 100 such as the dynamic terminal landing platform 210 as well as the mechanical elevation solution 112. The dynamic terminal landing platform 210 may include a mechanical and/or electrical connection 212 which may temporarily couple to the UAV 108 after landing on the UAV landing zone 102 in reference to the electrical and/or mechanical link 600 shown in FIG. 6.

The mechanical elevation solution 112 may facilitate the transport of the SC 110 from one of the preselected modular power bay 700 (e.g., N modular power bays) which may also be in communication with an energy replenishment system 214 which may charge the one or more SC 110 contained within the modular power bay 700. The MPB status monitor 216 may also be incorporated within the modular power bay 700 for obtaining a status of each of the SC 110.

As described above, the RPS central processor 218 may incorporate a RPS data storage 230 module and one or more sensor systems 220 which monitor the status of the various components within the RPS 100. For instance, aside from the external environment sensors 224, a UIS location sensor 222 may be in communication with the mechanical elevation solution 112 to monitor and/or control a positioning of the solution 112 relative to the UIS 300 of a landed UAV 108. Also, a MPB state monitor system 226 may be in communication with the MPB status monitor 216 so as to monitor a status of the modular power bay 700. The RPS system state sensors 228 within the sensor systems 220 may be in communication with the RPS environment control system 232.

While the RPS 100 may be self-contained, the RPS system may be in wired or wireless communication through the transmitter and receiver 106 within the RPS central processor 218 with a remotely located system through a communication network 234 for transmitting and/or receiving data as well as instructions.

Figure 2B:
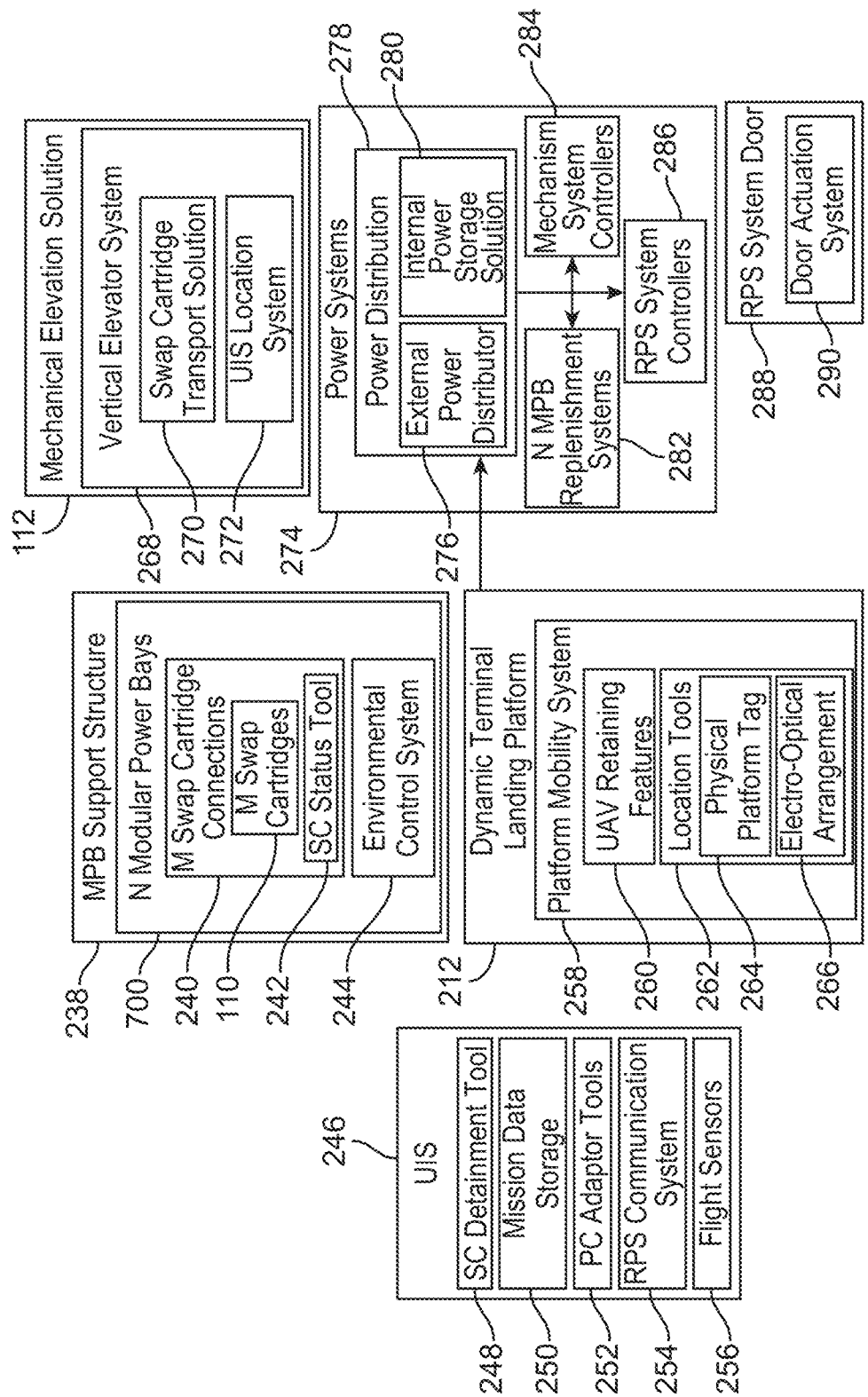

Within the RPS 100 system, schematic diagrams of some of the sub-systems are shown in FIG. 2b. With reference to the UIS 246 which is secured to the UAV, retains the SC 110, and interacts with the RPS 100, the UIS 246 may generally include an SC detainment tool 248 for retaining or securing the SC 110 during flight. A mission data storage medium 250, PC adaptor tools 252, RPS communication system 254, as well as flight sensors 256 may also be incorporated.

The dynamic terminal landing platform 212 may include a platform mobility system 258 which controls and monitors the retrieval of the SC 110. As part of the platform mobility system 258, a UAV retaining features 260 may be incorporated, as described herein, as well as location sensors 262 for locating the position and orientation of the UAV. This may include a physical platform tag 264 as well as electro-optical arrangement 266 for determining the position and orientation.

The power system 274 may include the power distribution 278 which in turn includes the external power distributor 276 and internal power storage solution 280 for controlling and/or monitoring the power when receiving from or delivering to an external source and/or when charging or powering the internal systems. The external power distributor 276, for instance, may be in communication with the dynamic terminal landing platform 212 for controlling and/or monitoring the charging of the UAV systems when landed. The power distribution 278 may also power the various mechanical system controllers 284, RPS system controllers 286, as well as the MPB replenishment systems 282.

The mechanical elevation solution 112 may also include a vertical elevator system 268 for lifting and/or lowering the SC 110 from or to the modular power bay 700. This may include a swap cartridge transport solution 270 as well as the UIS location system 272 for also locating the position and orientation of the UIS upon the UAV.

The MPB support structure 238 may include the modular power bays 700 which includes the swap cartridge connections 240 and environmental control system 244. The swap cartridge connections may include the one or more SC 110 as well as the SC status tool 242.

Additionally, the RPS system door 288 may also be seen which includes a door actuation system 290. The RPS system door 288 may be opened when swapping out the SC 110 from a landed UAV or closed when not in use or after a UAV has departed the RPS.

Figure 4A:
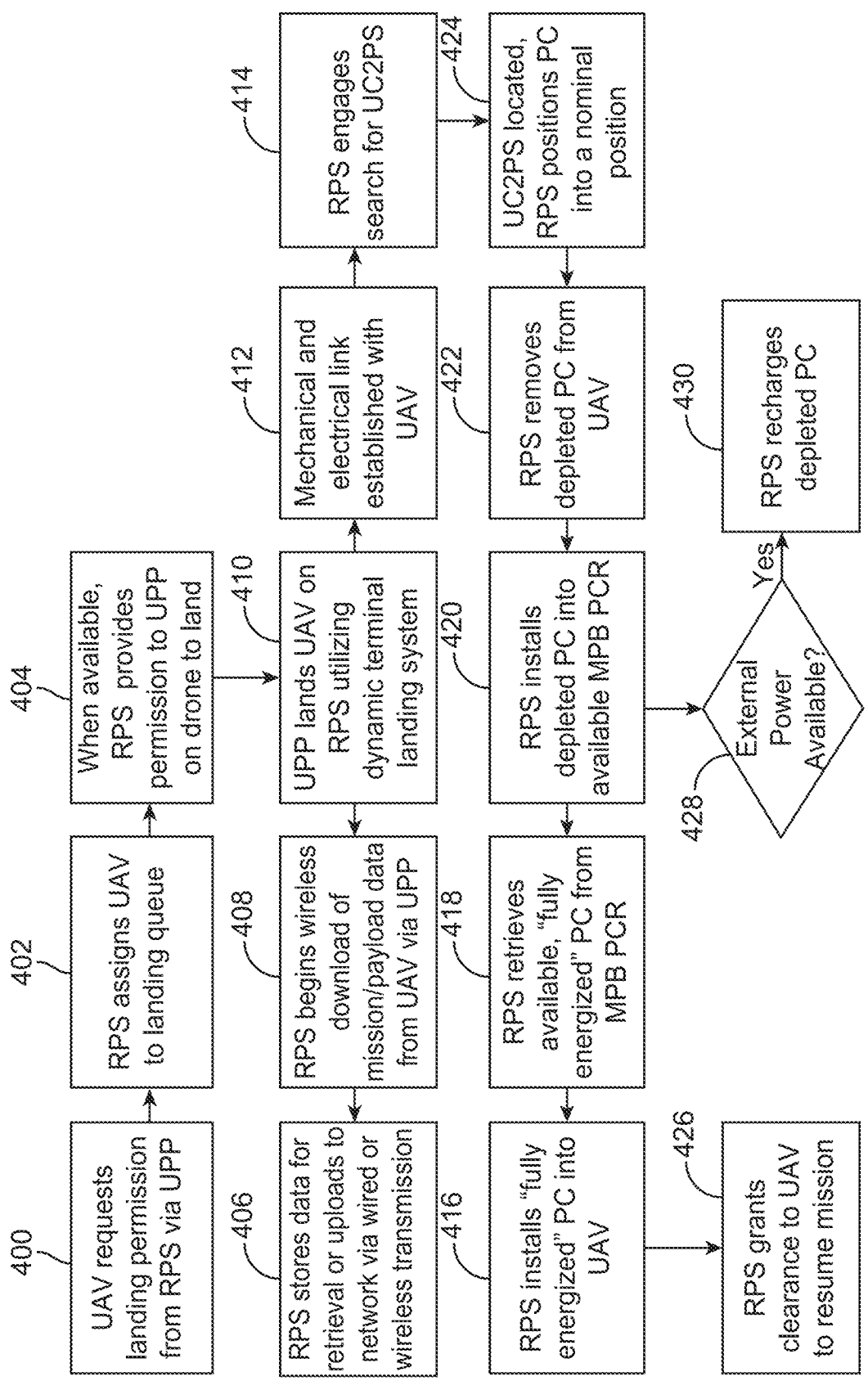
FIGS. 4a-4b are schematic illustrations of a block diagram of the methodology for a swap cartridge (SC) exchange on an embodiment of an RPS.

The schematic diagram of FIG. 4a, in accordance with some or all aforementioned components, illustrates one example of a method of SC 110 exchange for with an embodiment of an RPS 100. A UAV 108 may utilize an RPS 100 for the purposes of, but not limited to, SC replenishment, safe stowing, and/or data transmission, etc. A UAV 108, via some predetermined (external to the RPS 100 system) conditions, the UAV 108 may request for permission 400 to land onto an RPS 100, where the request is transmitted via the USP 1102. When approved by the RPS-CP in the RPS 100, the active UAV 108 is assigned a position in the landing queue 402. When an RPS 100 is available, said RPS 100 provides permission 404 to land to the appropriate UAV USP 1102. The USP 1102 then guides the landing UAV 108 onto an RPS 100 utilizing the DTL system 410.

After the successful landing of a UAV 108 onto the RPS 100, the RPS 100 may begin to access and download 408 mission and/or payload data from the landed UAV 108 via the USP 1102. The data may be stored within the RPS data storage or transmitted to a separate location via a wired or wireless transmission 406.

The landed UAV 108 may also establish 412 an electrical and/or mechanical link 600 with the RPS 100. The RPS 100 may now begin a search 414 for the UIS 300 which may be adapted to the landed UAV 108. Upon location of the UIS 300 of the landed UAV 108, the RPS 100 may position the UIS 300 into a nominal position 424 for removal of one or more SCs 110 from the stationary UAV 108 via the SC swapping adapter 302. After removal 422 of desired SC or SCs 110, the depleted SC or SCs 110, may be allocated 420 to an available MPB SCR 702 for replenishment or storage. The RPS 100 may return 418 an energized SC, or SCs 110, compatible to the UIS 300 of the stationary UAV 108 and then install the "fully energized" PC into the UAV 416. Dependent on an external power source 428 supplied to a RPS 100, said depleted SC 110 is capable of being energized 430.

Once the RPS 100 has replenished the UIS 300 of the stationary UAV 108, said UAV 108 may be cleared 426 to leave the RPS 100. In consideration, before a UAV 108 is cleared to launch from an RPS 100, environmental conditions 236 may be assessed to confirm safe flight possible for the UAV 108 based on inherent flight capabilities and may involve a primary systems check and preflight check of the UAV 108.

Figure 4B:
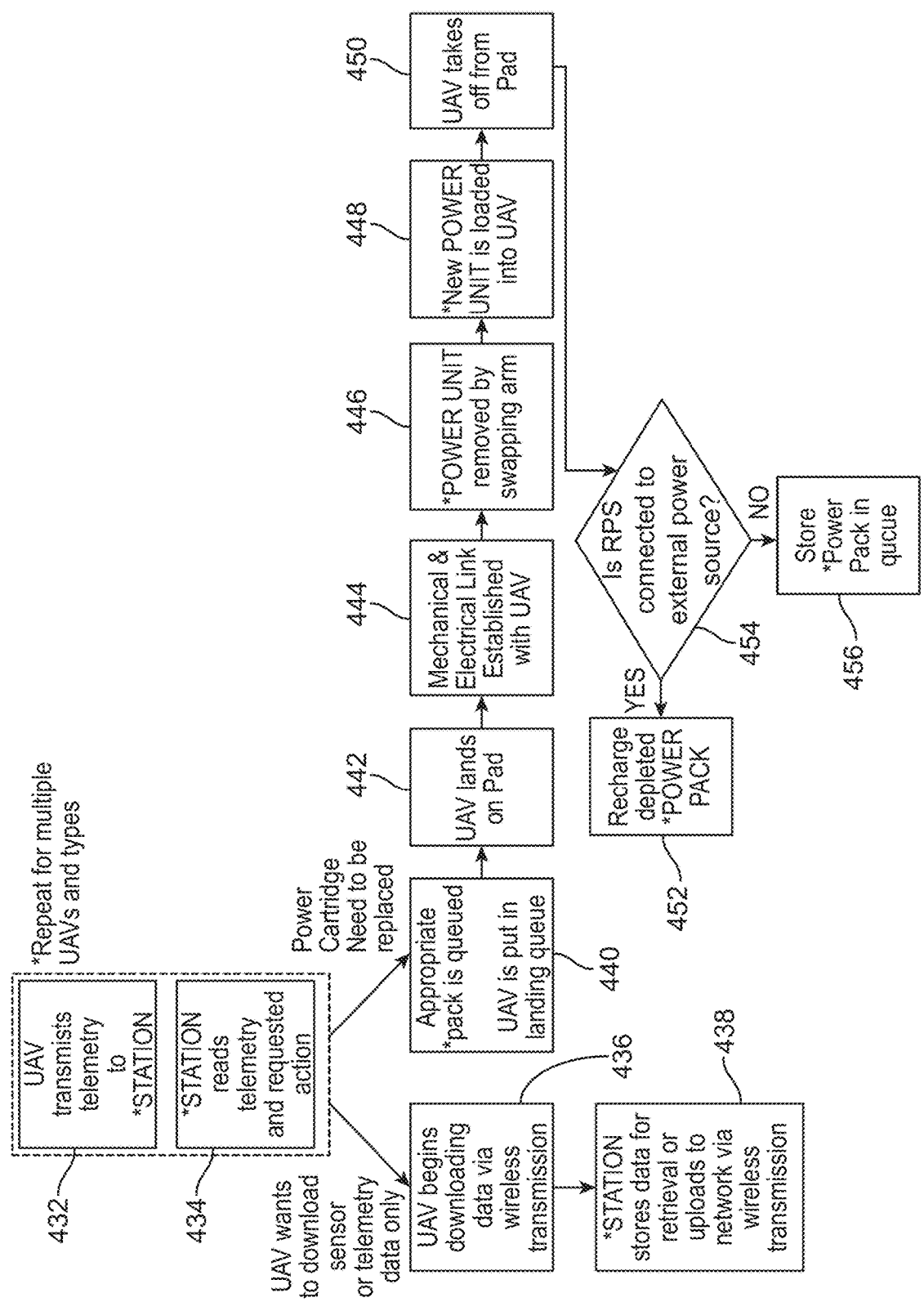

FIG. 4b illustrates another variation for a method of SC 110 exchange with an embodiment of an RPS 100. When the UAV 108 is in use, it may transmit telemetry to an RPS 100 system 432 and the RPS 100 may receive the telemetry and requested action by the UAV 434. This action may occur multiple times in any given time period during UAV flight and may also be repeated for multiple UAVs which may be in use simultaneously.

In the event that the UAV 108 wants to download sensor or telemetry data only, the UAV 108 may begin downloading the data via wireless transmission 436, as previously described, and the RPS 100 may store the data for retrieval at a later time or it may upload the data 438 to a communications network 234, as previously described.

In the event that the SC 110 needs to be replaced, the RPS 100 may determine which replacement SC from the MPB 700 is to be queued and the UAV 108 is then placed in a landing queue 440 (depending on whether other UAVs are queued for landing). Once the UAV 108 has landed 442 on the landing zone 102 of the RPS 100, the mechanical and/or electrical link may be established 444 with the UAV 108, as previously described. The SC 110 may be removed 446 from the UAV 108 and a new SC may be loaded 448 into the UAV 108. The UAV 108 may then be cleared for take-off 450 from the landing zone 102.

The RPS 100 may make a determination as to whether the RPS 100 is connected to an external power source 454 in which case the depleted SC 110 may be charged 452 accordingly. Otherwise, if the RPS 100 is not connected to an external power source, the depleted SC 110 may be stored in a queue 456 within the MPB 700 or it may be charged by an internal power source.

In utilizing any of the UAVs described herein, one particular application may include a protocol where data is sent via any number of wireless transmission protocols (e.g., electrical, electromagnetic, optical, etc.) from a separate and distinct sensing system which is triggered or actuated in order to initiate a predetermined flight protocol for the UAV depending on the event which is triggered or actuated. The separate sensing system may include, but is not limited to, radar, cameras, proximity sensors, or other sensing technologies such as an electric fence which are positioned at a predetermined location for performing certain activities such as monitoring or observing that location, identifying any potential static or dynamic hazards within that location for obstacle avoidance or for reporting back to an operator, identifying a particular location requesting delivery of, e.g., a parcel, etc.

As the sensing system is monitoring the predetermined location, the system may transmit data upon detecting an anomaly in the location. This data may be used to trigger the flight system of the UAV, e.g., to move the UAV to a new position and/or use onboard sensors or other non-flight systems to conduct a specified or predetermined task. Additionally, the pairing of an external, third-party sensor would allow for automated validation of a remote detection without the need of a human to aid in false alarm reduction, while also reducing response times.

Any of the UAVs or UAV systems described herein or in U.S. Pat. Nos. 9,969,285 and 9,783,075 and U.S. Pat. Pub. 2018/0222339 may be used with the sensing system described herein. Each of these patents or patent applications are incorporated herein by reference in its entirety and for any purpose.

To implement the sensing system with the UAV 108 and RPS 100 with a sensing system, a software algorithm which functions as a command-and-control feature may be used, e.g., through a cloud-based web interface, such that all three components of the UAV 108, RPS 100, and command-and-control software functions as a cohesive system. Users of the command-and-control software may control the entire system to perform any number of tasks such as defining geofences (e.g., polygons on a map in which the UAV 108 is permitted to fly, etc.), planning missions (e.g., dropping waypoints on a map, etc.), conducting flight operations (e.g., deploying and recalling the UAV 108, viewing video from the UAV 108 in real time, etc.). Additionally, using an open API, the software can receive alarms from third party devices such as radars, electric fences, security cameras, etc.

Figure 12:
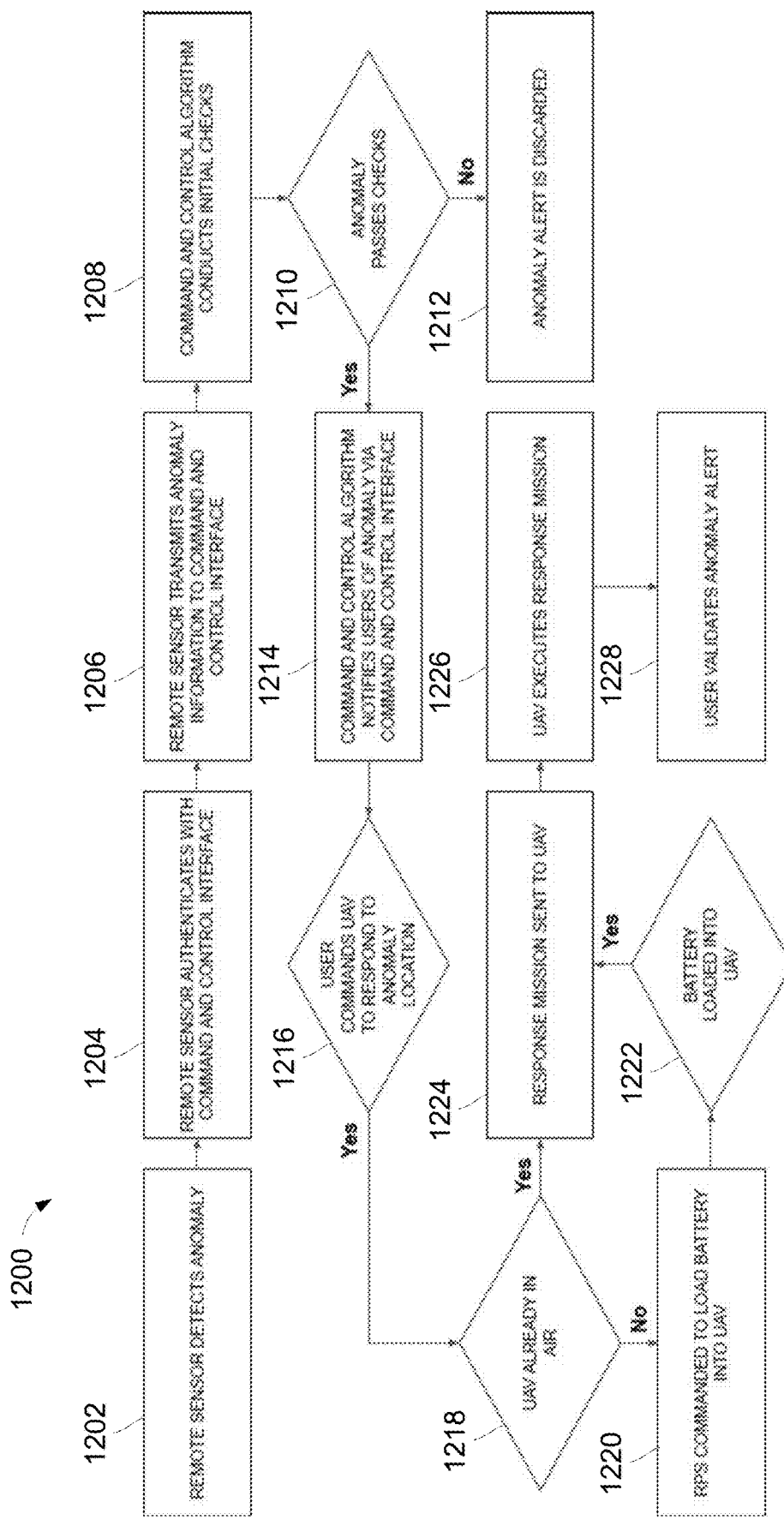
FIG. 12 is a flow diagram illustrating how the sensing system may be utilized to command the UAV in reacting to and/or investigating anomalies.

A flow diagram 1200 is shown in FIG. 12 to illustrate generally how the sensing system may be utilized to command (manually and/or automatically) the UAV 108 in reacting to and/or investigating anomalies which are detected either directly or remotely. As shown, upon a remote sensor 1202 detecting some anomaly 1202 (e.g., motion, unauthorized entry in a monitored area, etc.) the remote sensor may first authenticate with a command-and-control interface 1204 by transmitting the anomaly information to the command and control interface 1206. An algorithm run by the command-and-control interface may perform an initial check 1208 as to the validity of the detected anomaly. In processing the anomaly information 1201, the command-and-control interface may determine whether the detected information passes or fails a predetermined criteria as to whether the anomaly is worthwhile further investigation. This may be determined automatically by the algorithm or it may be determined by a human user who may review the transmitted information. In the event that the detected anomaly information fails against the criteria, the anomaly alert is discarded 1212 but in the event that the anomaly information passes the initial check, the command-and-control algorithm may notify users of the anomaly via the command-and-control interface 1214 displayed upon a monitor, screen, or other user interface.

Upon notification by the command-and-control algorithm, the user may then affirmatively command the UAV 108 to respond to the location of the anomaly 1216. In other variations, the UAV 108 may be automatically dispatched or diverted by the controller to deviate its flight path to investigate the location of the anomaly. In the event that the UAV 108 is stationary upon its RPS 100 or housing and not in the air, the command-and-control algorithm 1218 may command the RPS 100 to load a fresh power supply or battery into the UAV 1220 so that once the battery has been loaded 1222, the UAV 108 may be readied to receive a response mission 1224 for investigating the anomaly. In the event that the UAV 108 is already in the air on an initial mission, the response mission may be sent to the UAV 1224. The UAV 108 may then execute the response mission 1226 by diverting its flight path to the location of the anomaly and the user may then validate the anomaly alert 1228.

Figure 13:
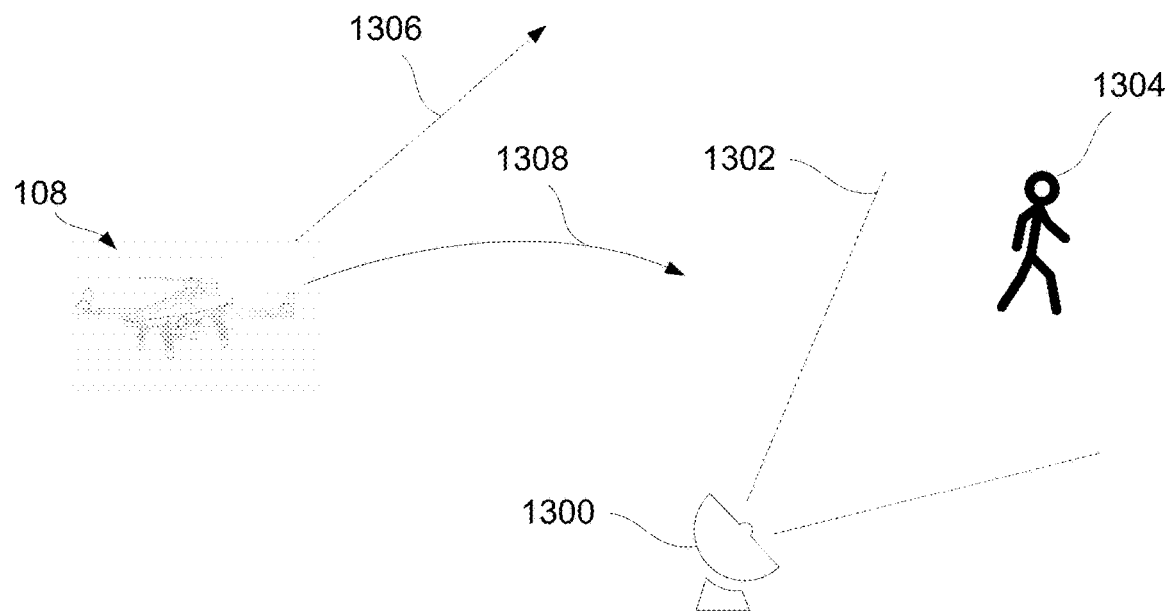
FIG. 13 is a schematic representation illustrating how the UAV may be triggered to deviate from its initial flight path upon receiving an alert from a remote sensing system detecting an anomaly.

One specific example of in how the sensing system may be utilized is shown schematically in FIG. 13 to illustrate how the UAV 108 may be directed along an initial flight path 1306, e.g., on a predetermined patrol. When an external sensing system 1300, e.g., a radar system, which is configured to monitor a preset or predetermined location 1302 detects an anomaly such as an unauthorized person 1304 entering a restricted (monitored) zone, the sensing system 1302 may transmit an alert signal either directly to the UAV 108 or to another location (such as a relay station or RPS 100) for transmission to the UAV 108. The UAV 108 may then be programmed to automatically respond by altering its flight path 1308 from its initial flight path 1306 to intercept the anomaly. Alternatively, the UAV 108 may be programmed to send a request to an operator for permission to alter its flight path where the UAV 108 may continue on its initial flight path 1306 until permission is granted by the operator in response to the command-and-control algorithm to alter its flight path 1308. The UAV 108 may then be used to visually confirm the presence or activity of the anomaly. The data received from the sensing system 1300 may also be used to guide the UAV 108 directly to the anomaly and/or can also be used to optionally illuminate the anomaly if detected under low light conditions.

Figure 14:
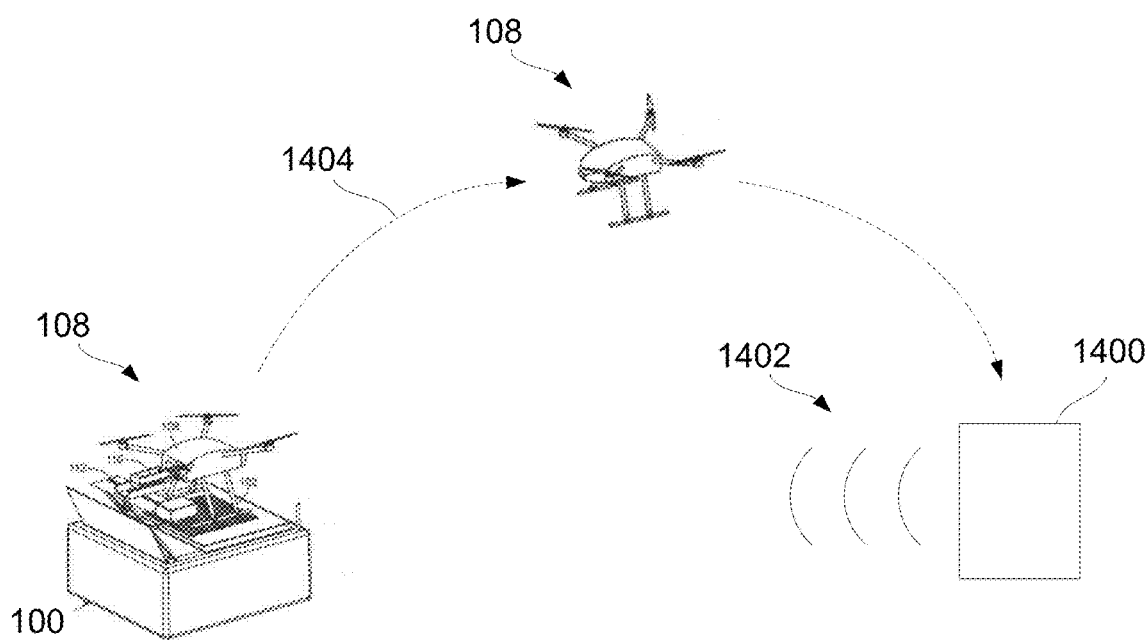
FIG. 14 is a schematic representation illustrating another example of how the UAV may be triggered from a standby position to investigate a sensed or actuated anomaly.

In another example, as illustrated schematically in FIG. 14, the UAV 108 may remain on standby, e.g., on a predetermined holding pattern in flight or positioned upon a RPS 100, as shown. Upon receiving an alert signal 1402 from a sensing station 1400 (e.g., a sensing system 1300, emergency kiosk 1400, etc.), the alert signal 1402 may be received directly by the UAV 108 or RPS 100, or via a relay station, which may trigger the system to automatically upload a mission to the UAV 108 and deploy the UAV 108 along a flight path 1404 directed to the sensing system 1300 or emergency kiosk 1400 to investigate.

Figure 15:
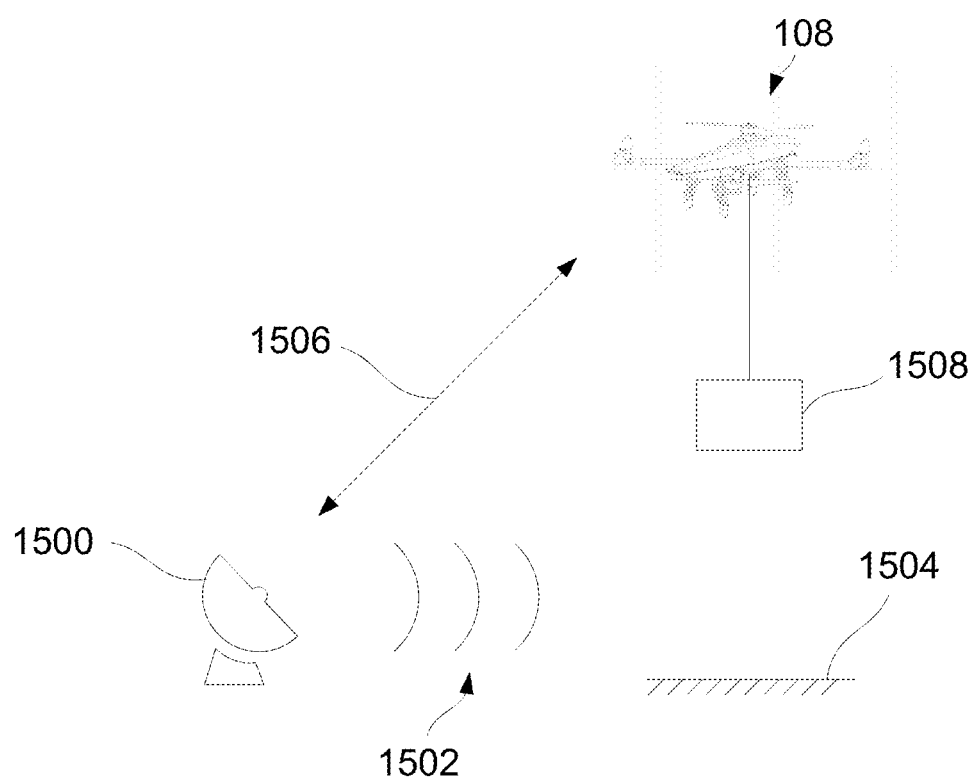
FIG. 15 is a schematic representation illustrating yet another example of how the UAV may be alerted by a remote sensing system for obtaining clearance when delivering a package to a designated landing zone.

In yet another example, as illustrated schematically in FIG. 15, the UAV 108 may be used to deliver a package 1508 to a designated landing zone 1504. As the UAV 108 reaches proximity to the landing zone 1504 or directly over the landing zone 1504, the UAV 108 may transmit a signal 1506 to a sensing system 1500, an automated controller, or to a human operator located remotely to request clearance to drop off the package 1508 upon the landing zone 1504. The sensing system 1500 may perform a check of the landing zone 1504 by transmitting a sensing signal 1502 to monitor for any obstructions or anomalies upon or in proximity to the landing zone 1504. Upon detecting a clear signal, the sensing system 1500 may transmit a signal 1506 to the UAV 108 to proceed with lowering or dropping the package 1508 from a safe altitude upon the landing zone 1504.

Aside from sensing systems, the UAV 108 may also be used with an electric fence detection system either alone or in combination with any of the sensing systems. As described in U.S. Pat. No. 9,642,230, which is incorporated herein by reference in its entirety, an electric fence may be positioned around the perimeter of the monitored area. This electric fence can thus be used to create an alarm zone or sub-zone where the electric fence may detect a fault which is indicative of an intrusion and this fault may be used to trigger an alert for transmission to the UAV 108 which can then respond accordingly, as described herein.

In implementing the electric fence, a time-domain reflectometer (TDR) is used to determine reflections of the electric pulse sent on the fence. A TDR is an electronic instrument conventionally used to characterize and locate faults in metallic cables, such as, for example, twisted wire pairs and coaxial cables. The TDR transmits a short rise time pulse along a conduction route of the electric fence. Any impedance discontinuities in the route cause some of the incident signal to be sent back, or reflected, towards the source. Increases in the impedance create a reflection that reinforces the original pulse, but decreases in the impedance create a reflection that opposes the original pulse. Return signals for given impulses are preferably compared to baseline return signals previously measured for a particular electric fence. A change in the measured return signal indicates a change in the electrical properties of the electric fence, which may be indicative of a problem with the electric fence. Both the reflected and the transmitted signals are collected and quantified. The fence is connected in a loop, where the output goes on one end of the loop and the return is the other end of the loop.

Fault location estimation is preferably based on an adaptation of time-domain reflectometry. A micro-processor rapidly samples the voltage of the outgoing and returning pulses. This allows the processor to perform various analyses on these sampled wave forms to look for faults, intrusions, or other aspects or irregularities of interest.

Hence, depending upon the outgoing and returning pulses, the processor may detect a fault in the electric fence and may estimate where the fault occurred along the fence. This data may trigger the server to send an alarm or alert to the UAV 108 to investigate the anomaly and may also provide an estimation of the location of the fault.

Figure 16A:
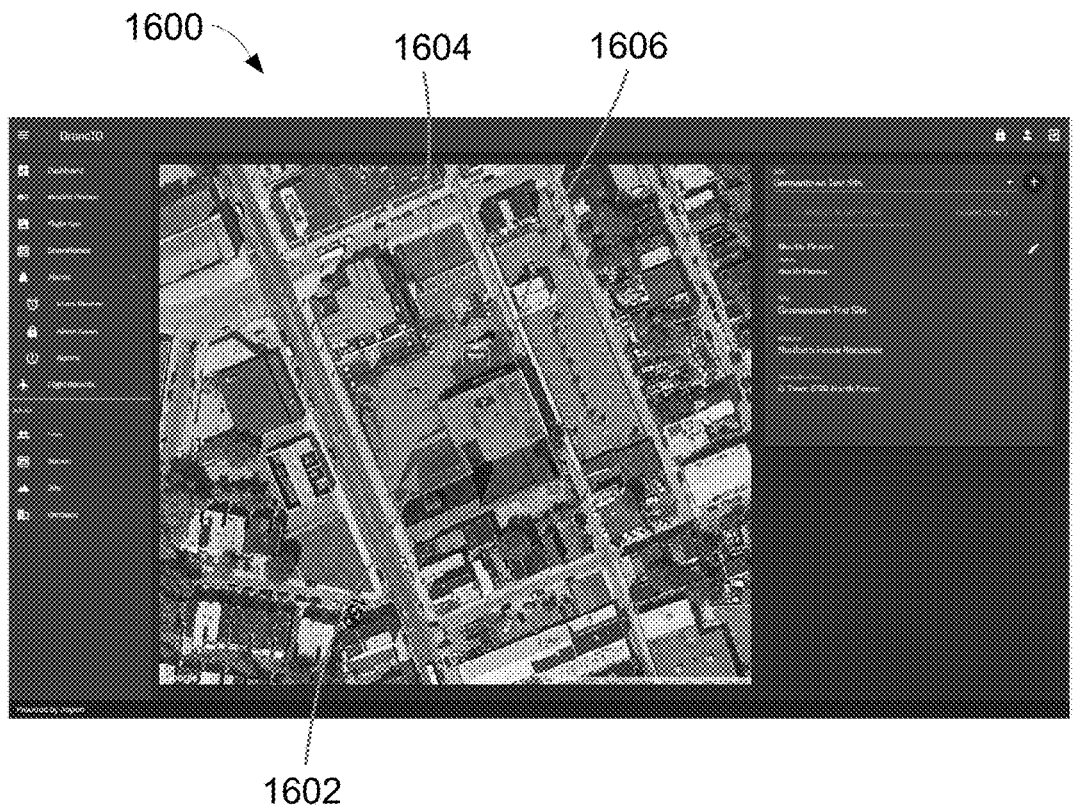
FIGS. 16A and 16B illustrate an example of a user interface for assigning or designating one or more alarm zones or sub-zones to a particular area.

In determining the areas or zones to be monitored or observed by the system, users may create one or more "alarm zones" for a given site. These alarm zones may define predetermined areas when viewed upon a map which are monitored by the system. FIG. 16A shows an example of an interface 1600 which may be used to create these alarm zones. A map or overhead image of a particular site 1606 to be monitored may be displayed to a user and one or more individual sub-zones may be optionally defined where each particular sub-zone may have a different level of monitoring and/or different levels of responses depending upon the sensitivity subscribed to a particular sub-zone. For example, a user may add one or more devices for which they are interested in receiving alarms (e.g., a user may not care in receiving radar alarms for an alarm zone that encompasses the main entrance, but may desire to receive alarms from a nearby electric fence in that area). Additionally and/or alternatively, an electric fence may be implemented around the perimeter of one or more of the alarm zones or sub-zones.

Additionally, the user may select a default mission for the UAV 108 to fly in a particular zone or sub-zone in response to an alarm. Hence, each zone or sub-zone may be assigned to have the same or a different default mission for the UAV 108 to follow depending upon the parameters of the mission for a particular zone or sub-zone. This also allows the user to utilize flight corridors and other site-specific flight mission constraints when responding to alarms. As illustrated in the figure, the site 1606 may be assigned a sub-zone 1604 where the response by the UAV 108 may be programmed to follow one particular mission. The assigned adjacent subzone 1602 may have the UAV 108 programmed to follow another particular mission.

Figure 16B:
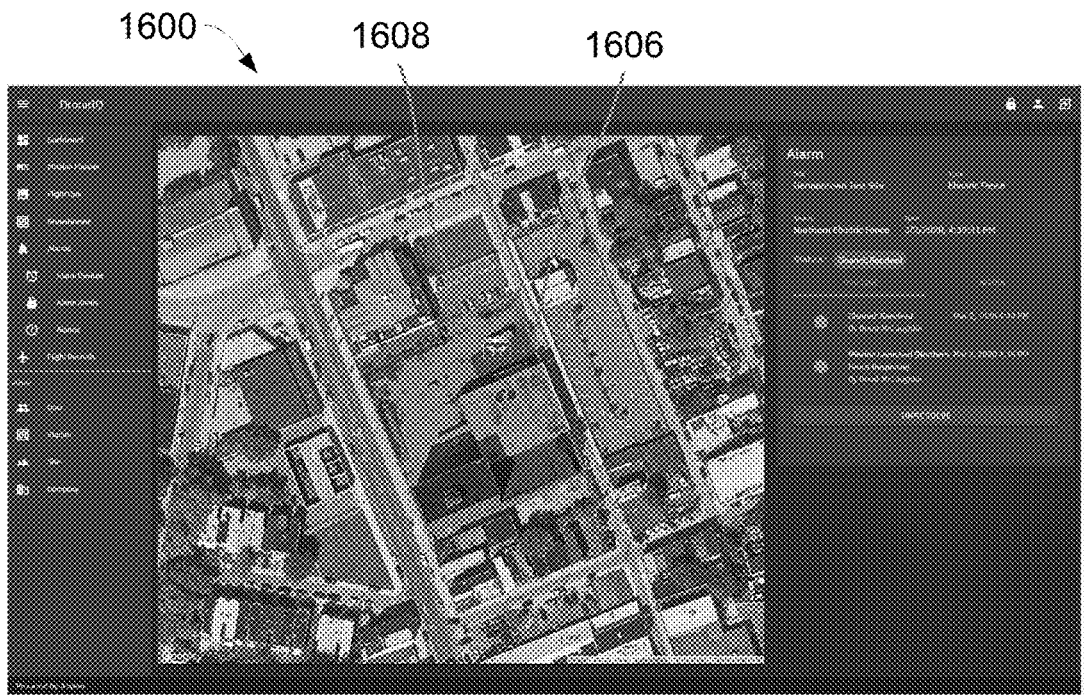

FIG. 16B shows the interface 1600 for site 1606 and shows one example of where a monitoring device 1608 may be positioned within the alarm zone. Although one device is shown, multiple devices and types of alerting devices such as electric fences may be positioned within or around the one or more alarm zones or sub-zones depending upon the desired coverage of the site.

Figure 17:
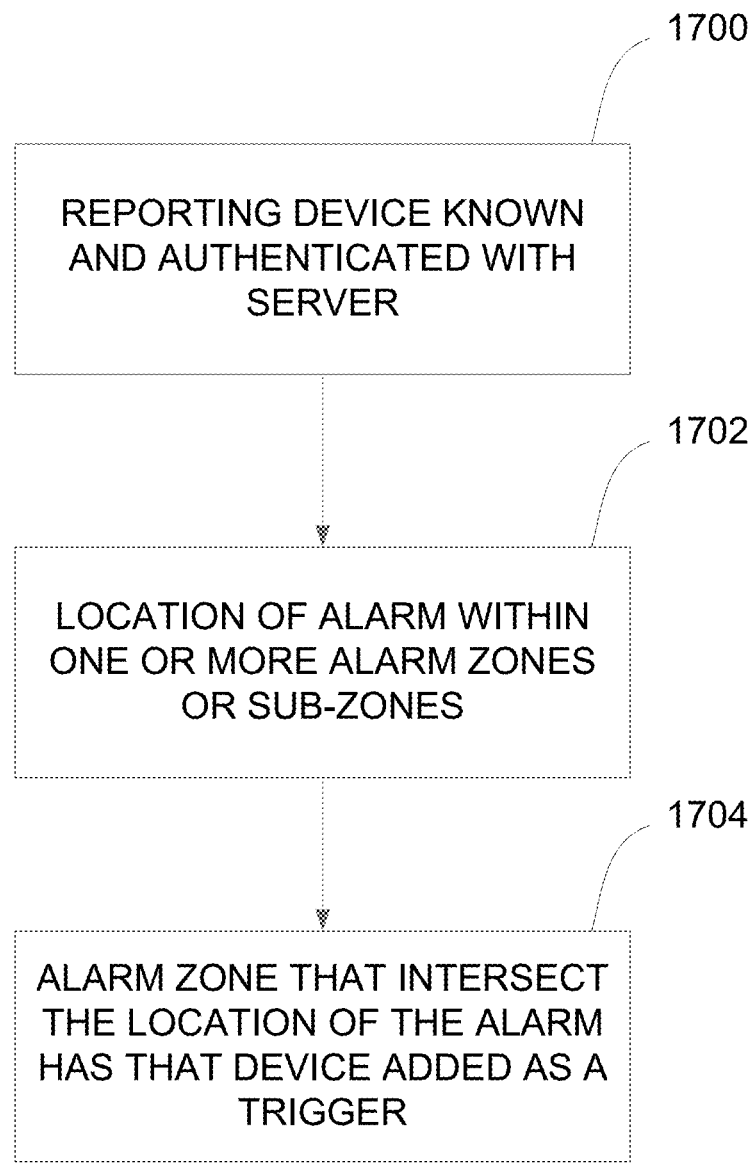
FIG. 17 illustrates an example of an initial set of checks performed by a server when an alarm or alert is received.

When an alarm or alert is received by the application programming interface of the UAV 108, a remote server in communication with the UAV 108 (e.g., through the RPS 100 or directly with the UAV 108) may perform an initial set of checks, as illustrated in FIG. 17. These checks may include first determining whether the reporting device is known and authenticated by the server 1700, whether the location of the alarm or alert is within one or more alarm zones or sub-zones 1702, and whether the one or more alarm zones or sub-zones that intersect the location of the alarm has that particular device added as a trigger 1704. Once the received alarm has satisfactorily completed the checks shown in FIG. 17, a notification may be sent from the server to the user with permissions for that particular site. The notification gives the user the option to launch the UAV 108 (e.g., using a default mission assigned to the particular alarm zone) to investigate, silence the alarm, or "clear" the alarm (e.g., mark the investigation of the alarm as complete).

Other devices (e.g., radars, CCTV cameras, etc.) may provide additional details as to the cause of the alarm being triggered, such as the alarm being triggered by a human, animal, vehicle, etc. In yet other variations, machine learning video classifiers may be applied to independently validate the triggering cause reported by the device. For instance, machine learning may be used to validate the cause of an alarm between different sensors such as when the radar reports that a human has triggered an alarm and the UAV 108 identifies a human. Such validation could be used to prioritize and escalate alarms for further response.

Furthermore, the user interface may be used to review received alarms and examine their details. Additionally, the system may log all actions taken on an alarm to provide an "audit log" should further investigation be needed post-incident.

Figure 18:
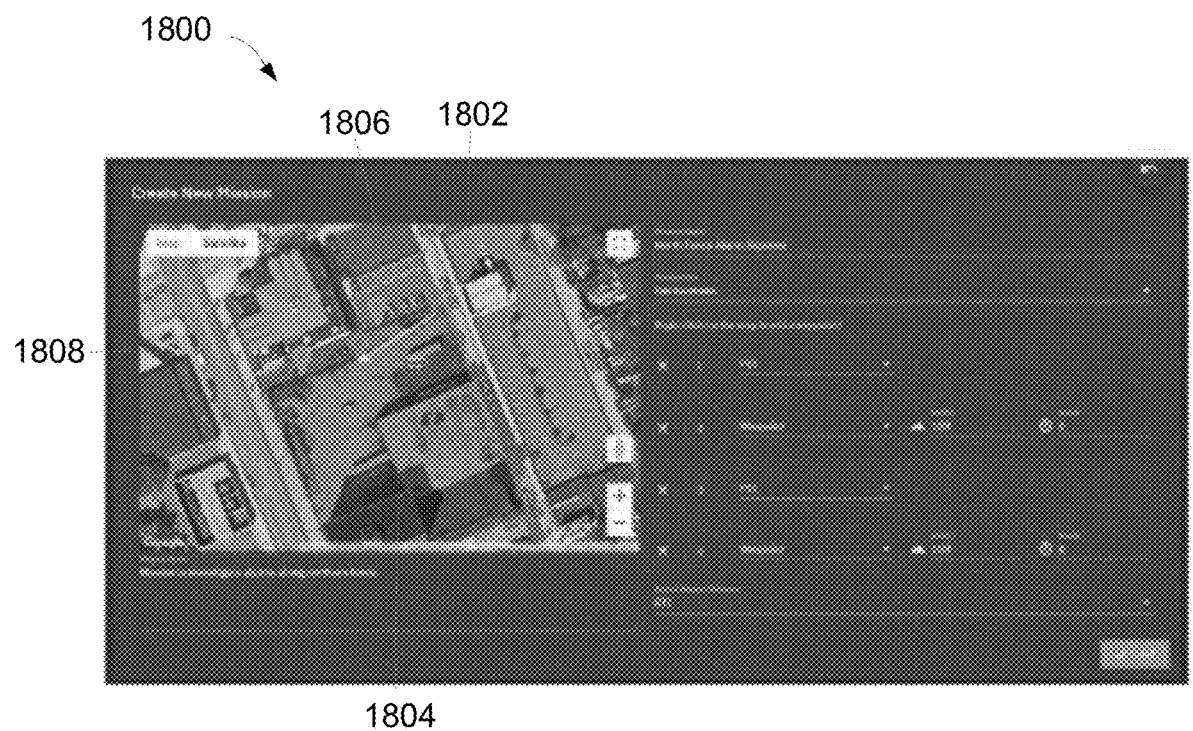
FIG. 18 illustrates one example of how a default response mission may be created for the UAV in investigating an alert or alarm for a detected anomaly.

FIG. 18 displays one example of how a default response mission may be created for the UAV 108 in investigating an alert or alarm for a detected anomaly within a specified alarm zone as described herein. A default response mission will be site and alarm specific for the circumstances provided, but the general goal of the response mission is to position the UAV 108 within the vicinity of the detected alarm so that surveillance of the immediate area can be initiated. With the command interface 1800 which may be displayed to the user upon a screen or monitor in communication with a controller or processor, one or more waypoints 1802, 1804 may be created in proximity to the alarm zone and one or more points of interest (POIs) 1806, 1808 may also be identified and marked by the user in order to help orient the user when surveilling the area.

Figure 19:
FIG. 19 illustrates an example of a specified alarm zone which encompasses waypoints and/or points of interest.

The geometry of the specified alarm zone 1902, as shown in the interface 1900 of FIG. 19, may be determined by the user upon the interface 1900. The specified alarm zone 1902 may be identified by a name and assigned a default mission. Any particular devices such as sensors (as described herein) which may trigger a notification to the user may also be selected. Hence, in the event that an anomaly is detected by a particular device within the alarm zone 1902, the UAV 108 whether in the air on upon the RPS 100 may follow the protocol described above (e.g., with reference to protocol 1200) so that the UAV 108 may alter or begin its flightpath (manually or automatically) to follow the predetermined waypoints within the alarm zone 1902 unless or until the user intervenes.

The alarm zone 1902 may be optionally configured to encompass the waypoints 1802, 1804 and/or the POIs 1806, 1808 of the response mission although this is not required. The alarm zone 1902 may be utilized by the user as a geospatial check on any received alarms to facilitate the filtering of anomalies down to those that may be of interest.

Figure 20:
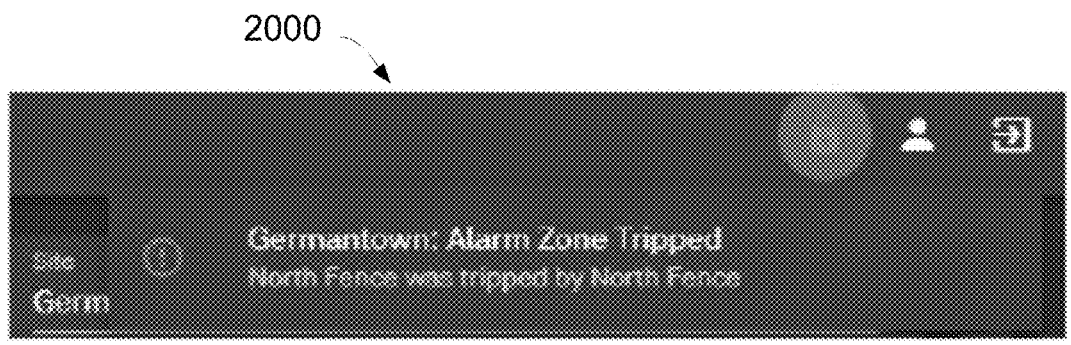
FIG. 20 illustrates an example of an alert interface which may be provided to the user.
Figure 21:
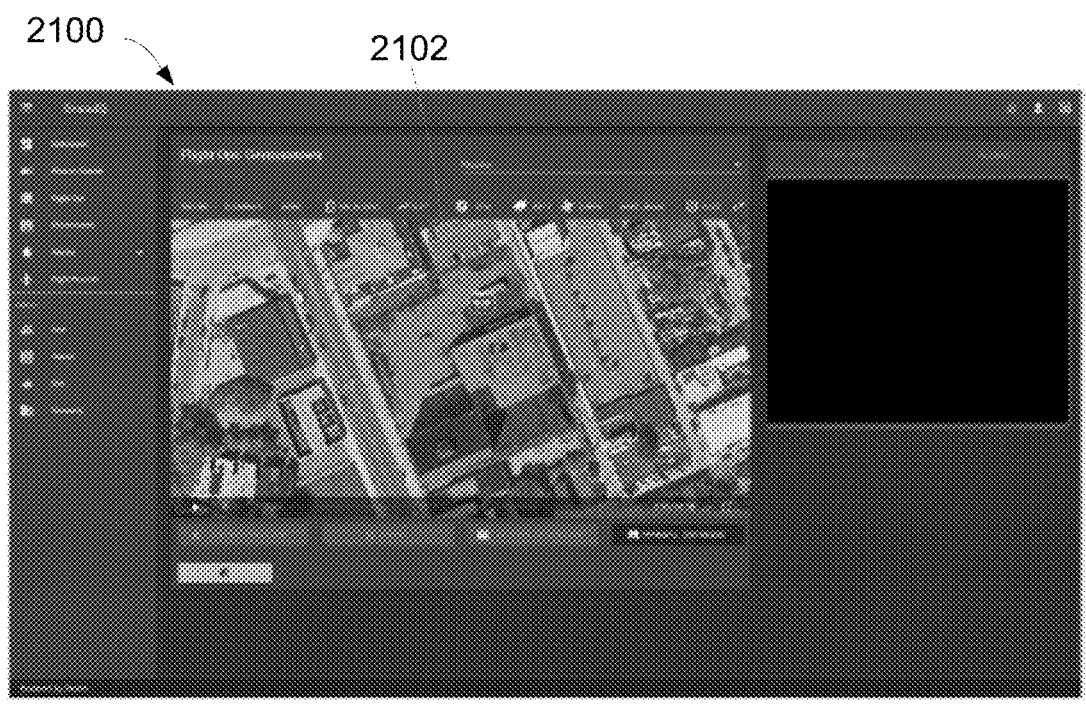
FIG. 21 illustrates an example of an interface which may display the location of the alarm as provided by the alarm device as well as some indication of the alarm location.

When the detected anomaly passes the initial checks 1210 (e.g., as described above in FIG. 12), the command-and-control interface may provide an alert interface 2000 (e.g., visual and/or auditory) to the user, as shown in the example of FIG. 20. The specific alarm zone of interest along with a visual indicator may be provided to the user in the alert interface 2000. Selection of the alert interface 2000 by the user may provide further information by automatically displaying a flight operations interface, as shown by interface 2100 in FIG. 21, which may display the location of the alarm as provided by the alarm device as well as some indication 2102 of the alarm location. The indication 2102 may be displayed to the user as a colored or flashing line or marker or some other visual and/or auditory indication of the particular location of the alarm so that the user may focus their attention in guiding the UAV 108 when investigating the alarm.

Figure 22:
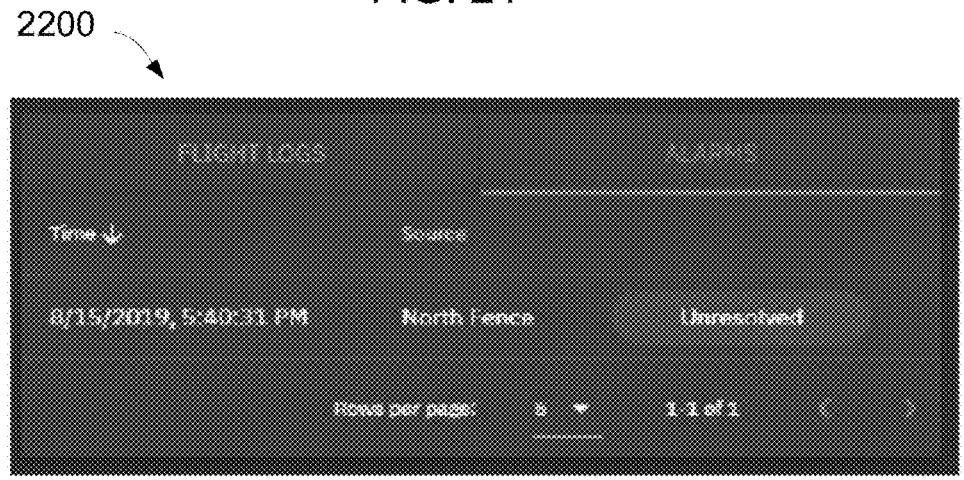
FIG. 22 illustrates an example of an interface which may optionally provide a list of any unresolved alarms.
Figure 23:
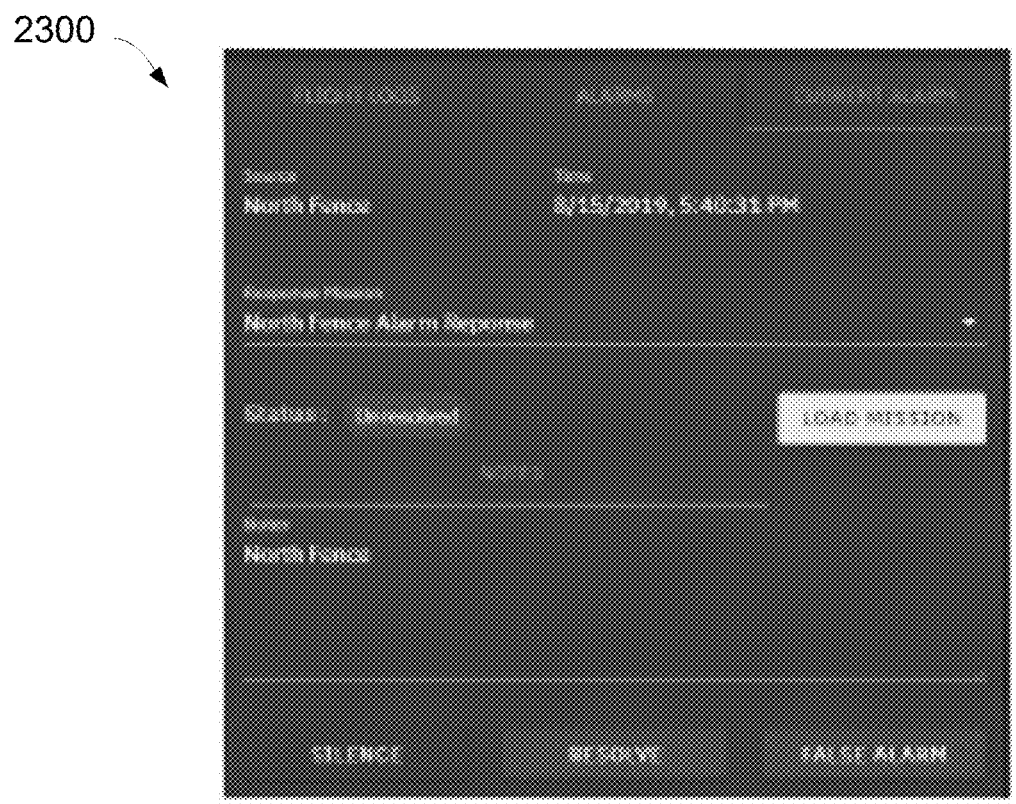
FIG. 23 illustrates an example of an interface which may optionally allow for the user to change the status of the unresolved alarm.

Additionally, a feature provided on the interface 2100 may also optionally provide a list of any unresolved alarms when selected, as shown by the interface 2200 in FIG. 22. The list of unresolved alarms may allow for the user to quickly isolate any alarms of interest. Selecting any particular alarm on the interface 2100 may provide for another interface 2300, as shown in FIG. 23, displayed to the user which may allow for the user to change the status of the unresolved alarm by selected another option, e.g., "Silence", "Resolve", "False Alarm", etc.

Figure 24:
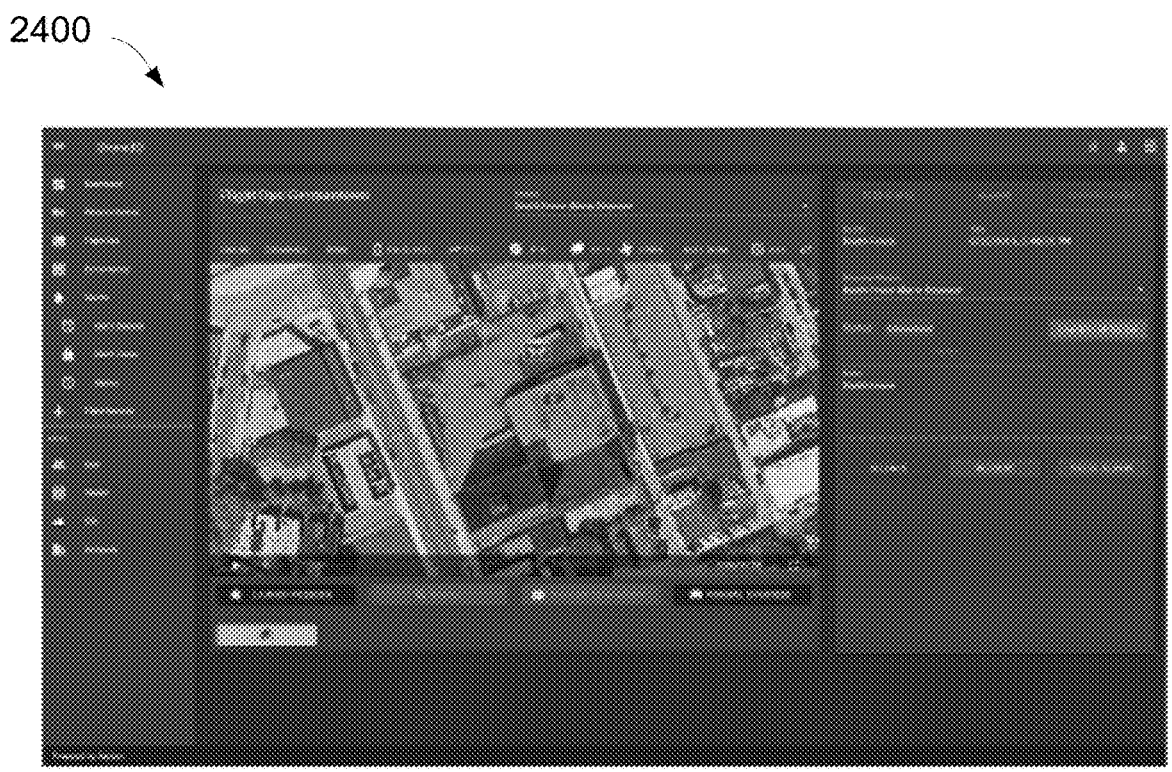
FIG. 24 illustrates an example of an interface which may allow for the user to instruct the UAV to load a selected mission such as a predetermined default mission.

In the event that the user receives an alarm, the user may instruct the UAV 108 to load a selected mission such as a predetermined default mission, as described above, as shown in the interface 2400 in FIG. 24. By launching the default mission (or another mission), the UAV 108 may begin its launching protocol (if located upon the RPS 100) or divert its current flightpath, as described above.

Figure 25:
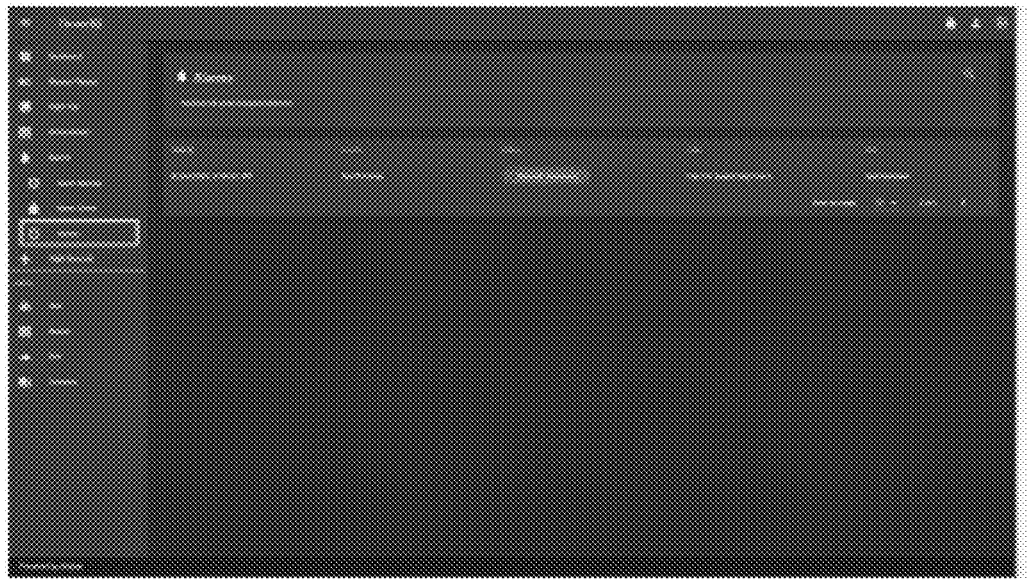
FIG. 25 illustrates an example of an interface which may allow for the user to view previous alarms along with various information related to the alarm.
Figure 26:
FIG. 26 illustrates an example of an interface which may optionally display information such as the location of the alarm on a map, as well as options to audit a log of all actions taken by all users associated with that alarm.

Previous alarms may also be displayed in a separate interface 2500 as shown in FIG. 25 which may list previous alarms along with various information related to the alarm such as an indication of the device that originated the alarm, the status of the alarm, the type of alarm device that originated the alarm, the site associated with the alarm etc. FIG. 26 shows another more detailed interface 2600 which may be provided to the user and which may optionally display information such as the location of the alarm on a map, as well as options to audit a log of all actions taken by all users associated with that alarm.

The applications of the disclosed invention discussed above are not limited to the embodiments described, but may include any number of other non-flight applications and uses. Modification of the above-described methods and devices for carrying out the invention, and variations of aspects of the invention that are obvious to those of skill in the arts are intended to be within the scope of this disclosure. Moreover, various combinations of aspects between examples are also contemplated and are considered to be within the scope of this disclosure as well.

What is claimed is:

1. A system for monitoring a selected area, comprising:
an unmanned aerial vehicle (UAV);
one or more sensors configured to monitor the selected area for an anomaly, wherein the selected area includes one or more alarm zones defined by a user as predetermined areas within the selected area and wherein at least one of the one or more alarm zones includes one or more sub-zones each having a level of response different from one another depending upon a sensitivity assigned to the one or more sub-zones;
a processor in communication with the one or more sensors and with the UAV, wherein the processor is programmed to control the UAV to follow a flight corridor in each of the one or more sub-zones based on a site-specific constraint in each of the one or more sub-zones,
wherein the processor is programmed to determine an alternative flight path of the UAV upon receiving an alert from the one or more sensors such that the alternative flight path deviates from a predetermined flight path of the UAV to the alternative flight path within a vicinity of the anomaly,
wherein the processor is further programmed to provide a display to the user with a specified alarm zone indicated within which the anomaly is detected,
wherein the processor is further programmed to provide upon the display one or more waypoints of the alternative flight path marked and one or more points of interest in proximity to the anomaly identified for orienting the user, and
wherein the processor is further programmed to initiate the alternative flight path upon receiving an approval from the user to alter the predetermined flight path to the alternative flight path for the UAV.

2. The system of claim 1 further comprising a reconfigurable power station (RPS) configured to replace a power supply from the UAV.

3. The system of claim 1 wherein the one or more sensors comprise a radar system.

4. The system of claim 1 wherein the one or more sensors comprise an electric fence.

5. A method of monitoring a selected area, comprising:
monitoring the selected area via one or more sensors configured to monitor the selected area, wherein the selected area includes one or more alarm zones defined by a user as predetermined areas within the selected area and wherein at least one of the one or more alarm zones includes one or more sub-zones each having a level of response different from one another depending upon a sensitivity assigned to the one or more sub-zones;
transmitting an alarm signal to a processor in communication with the one or more sensors upon detecting an anomaly in the selected area, wherein the processor is programmed to control the UAV to follow a flight corridor in each of the one or more sub-zones based on a site-specific constraint in each of the one or more sub-zones;
determining an alternative flight path of a UAV which deviates from a predetermined flight path of the UAV such that the alternative flight path is within a vicinity of the anomaly;
displaying to a user a specified alarm zone indicated within which the anomaly is detected;
further displaying to the user one or more waypoints of the alternative flight path marked and one or more points of interest in proximity to the anomaly identified for orienting the user;
initiating the alternative flight path upon receiving an approval from the user to alter the predetermined flight path to the alternative flight path for the UAV; and
transmitting the alternative flight path to the UAV for directing the UAV in proximity to the anomaly within the specified alarm zone.

6. The method of claim 5 wherein monitoring the selected area comprises detecting via a radar system.

7. The method of claim 5 wherein monitoring the selected area comprises detecting via an electric fence.

8. The method of claim 5 where transmitting an alarm signal to the processor further comprises authenticating the one or more sensors with a server in communication with the one or more sensors.

9. The method of claim 8 further comprising determining via a server a location of the alarm signal.

10. The method of claim 9 further comprising determining via the server whether a device reporting the alarm signal has been added as a trigger within the selected area.

* * * * *